United States Patent [19]
Takenaka et al.

[11] Patent Number: 5,221,883
[45] Date of Patent: Jun. 22, 1993

[54] SYSTEM FOR CONTROLLING LOCOMOTION OF LEGGED WALKING ROBOT

[75] Inventors: Toru Takenaka; Nobuaki Ozawa; Masao Nishikawa, all of Saitama, Japan

[73] Assignee: Honda Giken Kogyo Kabushiki Kaisha, Tokyo, Japan

[21] Appl. No.: 799,367

[22] Filed: Nov. 27, 1991

[30] Foreign Application Priority Data

Nov. 30, 1990 [JP] Japan ................... 2-336419
Nov. 30, 1990 [JP] Japan ................... 2-336420

[51] Int. Cl.$^5$ .......................................... G05B 19/00
[52] U.S. Cl. ........................... 318/568.12; 318/568.1; 901/1; 901/9; 180/8.1; 180/8.6; 395/80
[58] Field of Search ........ 318/565, 567, 568.1–568.22, 318/625; 395/88–99; 901/1, 2, 3, 9, 12, 15, 18, 20, 21, 22, 24, 44, 48, 47; 180/8.1, 8.6, 167, 169; 414/730

[56] References Cited

U.S. PATENT DOCUMENTS

| | | | |
|---|---|---|---|
| 4,202,423 | 5/1980 | Soto | 180/8 D |
| 4,437,380 | 3/1984 | Yamaguchi | 368/272 |
| 4,551,029 | 7/1985 | Aizawa | 368/273 |
| 4,575,832 | 3/1986 | Takese | 368/273 |
| 4,621,332 | 11/1986 | Sugimoto et al. | 901/9 X |
| 4,641,251 | 2/1987 | Inoue | 901/1 X |
| 4,683,773 | 8/1987 | Diamond | 901/48 X |
| 4,691,798 | 9/1987 | Engelbach | 180/209 |
| 4,826,392 | 5/1989 | Hayati | 901/9 X |
| 4,834,200 | 5/1989 | Kajita | 180/8.1 |
| 5,005,658 | 4/1991 | Bares et al. | 180/8.1 |

OTHER PUBLICATIONS

"Body Building" produced by Wayne Harlow and Mark Ford 1982.

*Primary Examiner*—Paul Ip
*Attorney, Agent, or Firm*—Lyon & Lyon

[57] ABSTRACT

A servo system for controlling locomotion of a biped walking robot, made up of a body link and two leg linkages each connected to the body link by a first drive joint and each including knee and ankle joints, to follow up a target angle for each drive joint predetermined in series with respect to time such that the robot walks. In order to stabilize robot posture when it could turn over, the drive speed of the joints are feedback controlled in responsive with the robot turnover probability. Moreover, the predetermined robot gait is modified at such instance, for example, in such a manner that robot leg lands one of additionally preestablished candidate positions for robot leg landing.

24 Claims, 30 Drawing Sheets

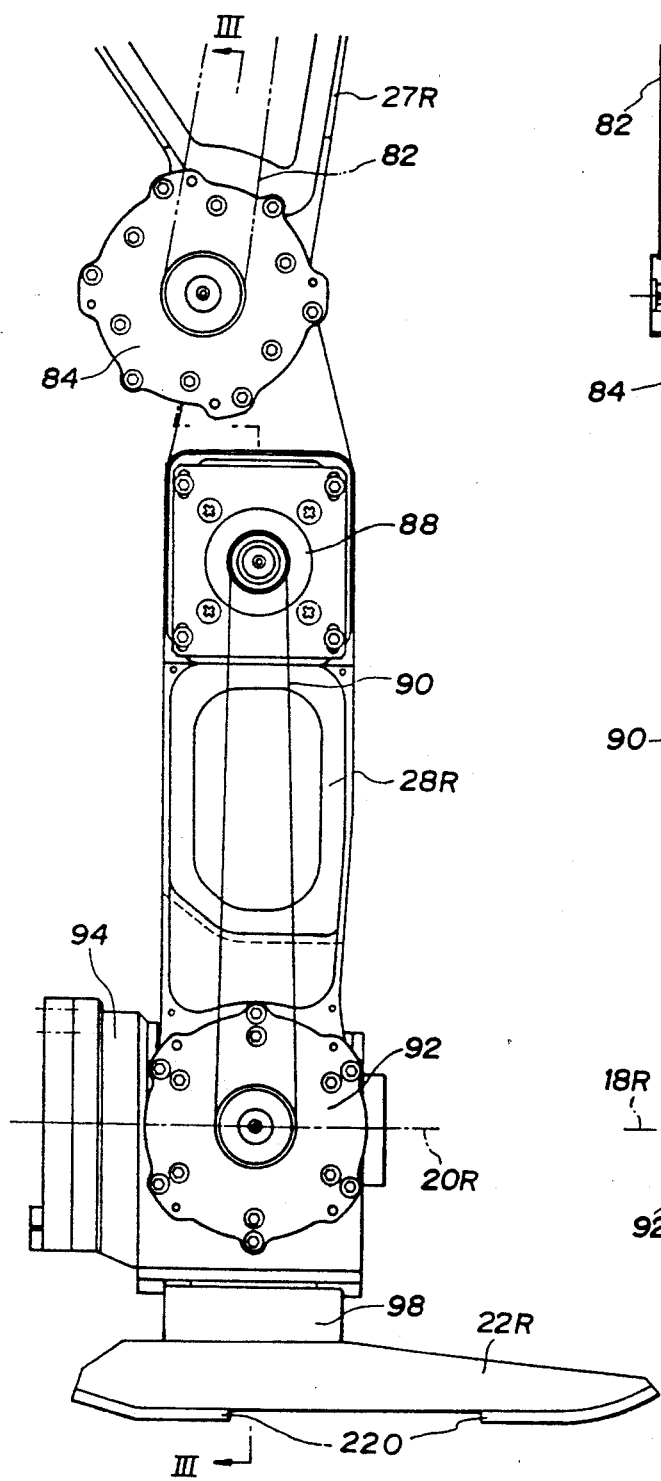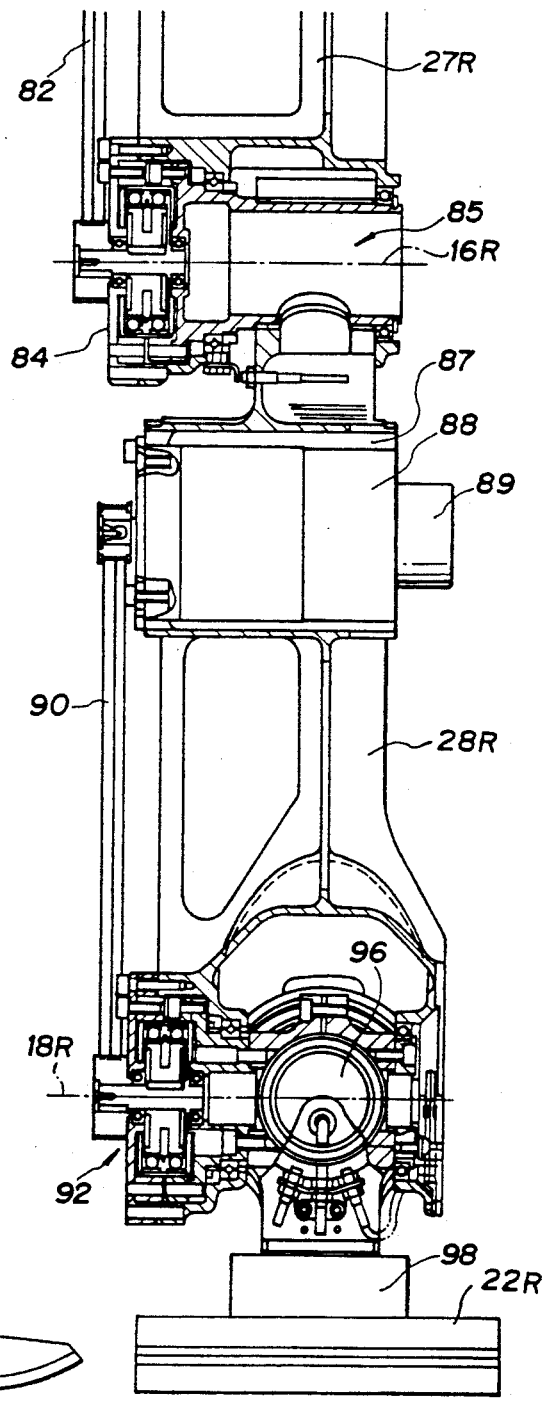

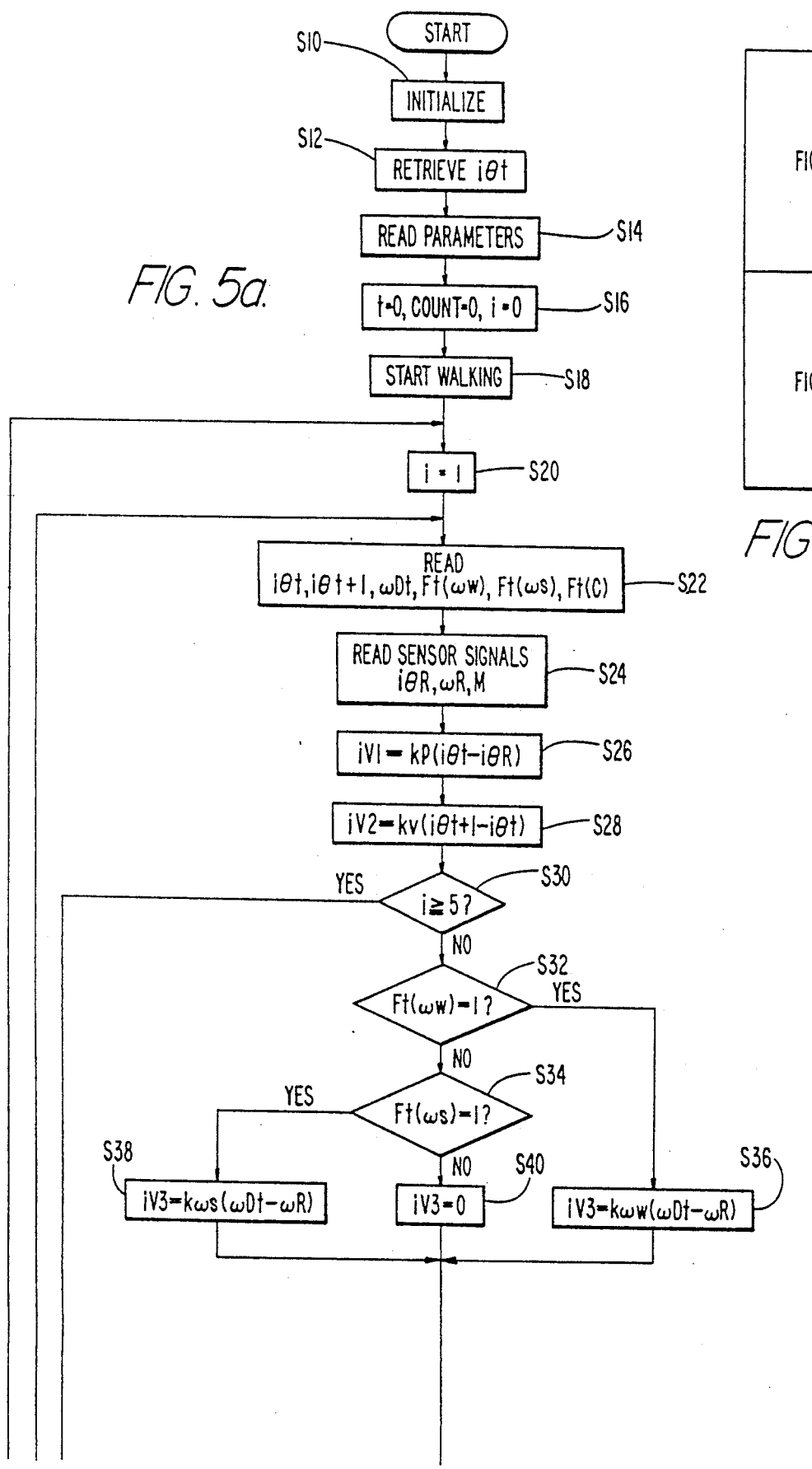

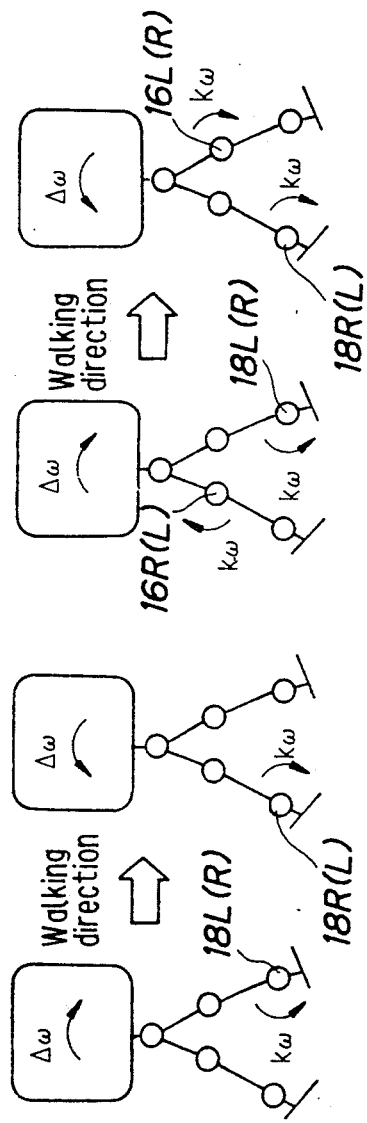
FIG. 16
FIG. 15
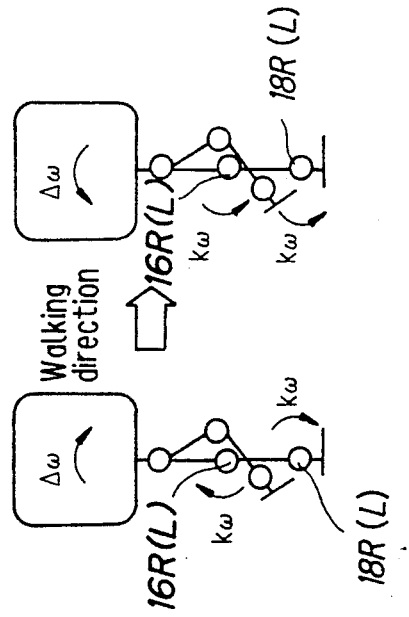
FIG. 17

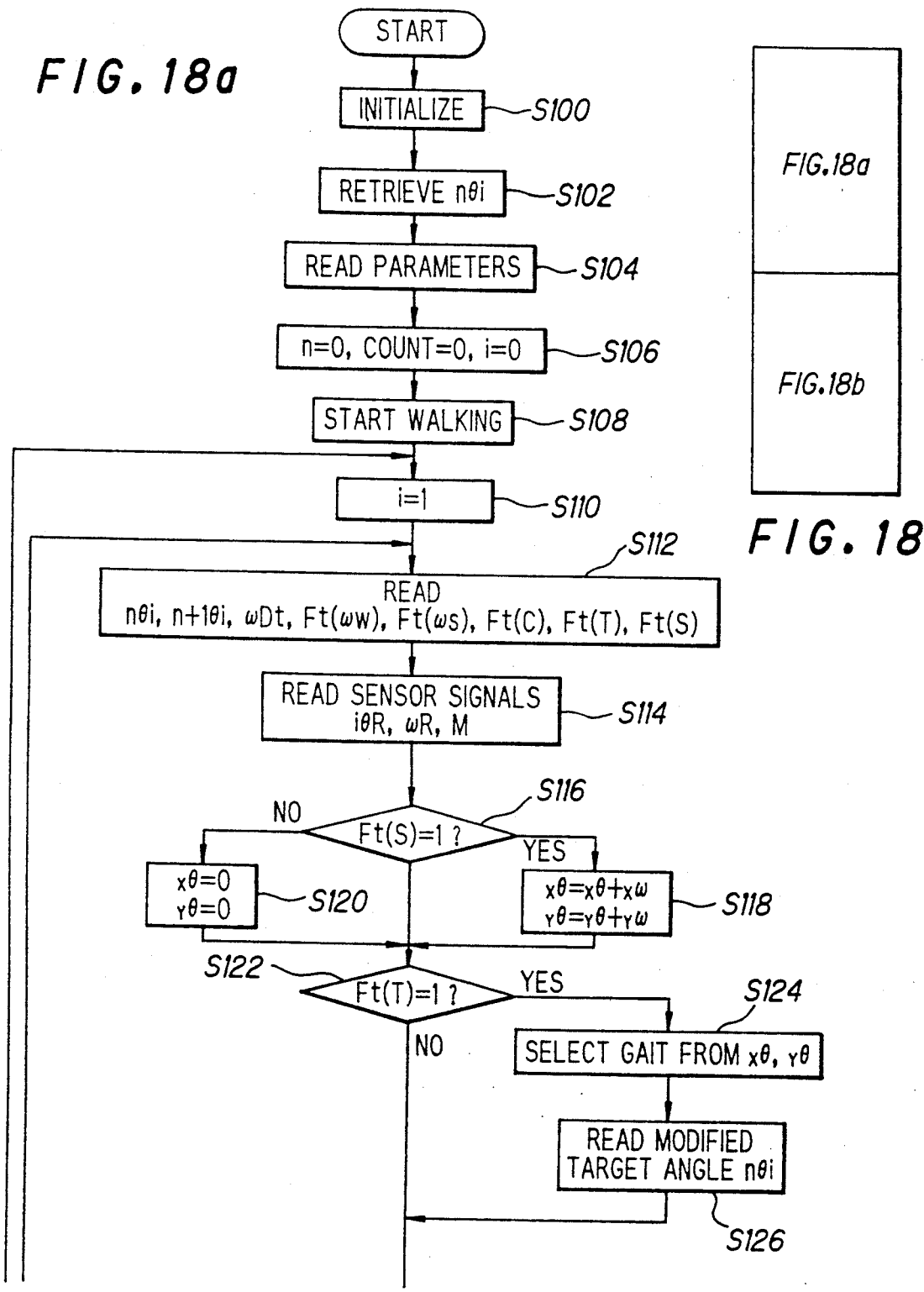

FIG. 19a

Right leg HC ▷

| 0θ01 | 0θ02 | 0θ03 | 0θ04 | 0θ05 | 0θ06 |
| 1θ01 | 1θ02 | 1θ03 | 1θ04 | 1θ05 | 1θ06 |
| 2θ01 | 2θ02 | 2θ03 | 2θ04 | 2θ05 | 2θ06 |
| 3θ01 | 3θ02 | 3θ03 | 3θ04 | 3θ05 | 3θ06 |
| 4θ01 | 4θ02 | 4θ03 | 4θ04 | 4θ05 | 4θ06 |
| 5θ01 | 5θ02 | 5θ03 | 5θ04 | 5θ05 | 5θ06 |

-----

Left leg TO ▷

| t0θ01 | t0θ02 | t0θ03 | t0θ04 | t0θ05 | t0θ06 |
| t1θ01 | t1θ02 | t1θ03 | t1θ04 | t1θ05 | t1θ06 |
| t2θ01 | t2θ02 | t2θ03 | t2θ04 | t2θ05 | t2θ06 |
| t3θ01 | t3θ02 | t3θ03 | t3θ04 | t3θ05 | t3θ06 |
| t4θ01 | t4θ02 | t4θ03 | t4θ04 | t4θ05 | t4θ06 |
| t5θ01 | t5θ02 | t5θ03 | t5θ04 | t5θ05 | t5θ06 |

-----

Left leg HC ▷

| u0θ01 | u0θ02 | u0θ03 | u0θ04 | u0θ05 | u0θ06 |
| u1θ01 | u1θ02 | u1θ03 | u1θ04 | u1θ05 | u1θ06 |
| u2θ01 | u2θ02 | u2θ03 | u2θ04 | u2θ05 | u2θ06 |
| u3θ01 | u3θ02 | u3θ03 | u3θ04 | u3θ05 | u3θ06 |
| u4θ01 | u4θ02 | u4θ03 | u4θ04 | u4θ05 | u4θ06 |
| u5θ01 | u5θ02 | u5θ03 | u5θ04 | u5θ05 | u5θ06 |

-----

Right leg TO ▷

| v0θ01 | v0θ02 | v0θ03 | v0θ04 | v0θ05 | v0θ06 |
| v1θ01 | v1θ02 | v1θ03 | v1θ04 | v1θ05 | v1θ06 |
| v2θ01 | v2θ02 | v2θ03 | v2θ04 | v2θ05 | v2θ06 |
| v3θ01 | v3θ02 | v3θ03 | v3θ04 | v3θ05 | v3θ06 |
| v4θ01 | v4θ02 | v4θ03 | v4θ04 | v4θ05 | v4θ06 |
| v5θ01 | v5θ02 | v5θ03 | v5θ04 | v5θ05 | v5θ06 |

-----

Right leg HC ▷ (repeated)

| 0θ01 | 0θ02 | 0θ03 | 0θ04 | 0θ05 | 0θ06 |
| 1θ01 | 1θ02 | 1θ03 | 1θ04 | 1θ05 | 1θ06 |
| 2θ01 | 2θ02 | 2θ03 | 2θ04 | 2θ05 | 2θ06 |
| 3θ01 | 3θ02 | 3θ03 | 3θ04 | 3θ05 | 3θ06 |

FIG. 19b $$
\begin{array}{cccccc}
0\theta_{07} & 0\theta_{08} & 0\theta_{09} & 0\theta_{10} & 0\theta_{11} & 0\theta_{12} \\
1\theta_{07} & 1\theta_{08} & 1\theta_{09} & 1\theta_{10} & 1\theta_{11} & 1\theta_{12} \\
2\theta_{07} & 2\theta_{08} & 2\theta_{09} & 2\theta_{10} & 2\theta_{11} & 2\theta_{12} \\
3\theta_{07} & 3\theta_{08} & 3\theta_{09} & 3\theta_{10} & 3\theta_{11} & 3\theta_{12} \\
4\theta_{07} & 4\theta_{08} & 4\theta_{09} & 4\theta_{10} & 4\theta_{11} & 4\theta_{12} \\
5\theta_{07} & 5\theta_{08} & 5\theta_{09} & 5\theta_{10} & 5\theta_{11} & 5\theta_{12} \\
\hline
t0\theta_{07} & t0\theta_{08} & t0\theta_{09} & t0\theta_{10} & t0\theta_{11} & t0\theta_{12} \\
t1\theta_{07} & t1\theta_{08} & t1\theta_{09} & t1\theta_{10} & t1\theta_{11} & t1\theta_{12} \\
t2\theta_{07} & t2\theta_{08} & t2\theta_{09} & t2\theta_{10} & t2\theta_{11} & t2\theta_{12} \\
t3\theta_{07} & t3\theta_{08} & t3\theta_{09} & t3\theta_{10} & t3\theta_{11} & t3\theta_{12} \\
t4\theta_{07} & t4\theta_{08} & t4\theta_{09} & t4\theta_{10} & t4\theta_{11} & t4\theta_{12} \\
t5\theta_{07} & t5\theta_{08} & t5\theta_{09} & t5\theta_{10} & t5\theta_{11} & t5\theta_{12} \\
\hline
u0\theta_{07} & u0\theta_{08} & u0\theta_{09} & u0\theta_{10} & u0\theta_{11} & u0\theta_{12} \\
u1\theta_{07} & u1\theta_{08} & u1\theta_{09} & u1\theta_{10} & u1\theta_{11} & u1\theta_{12} \\
u2\theta_{07} & u2\theta_{08} & u2\theta_{09} & u2\theta_{10} & u2\theta_{11} & u2\theta_{12} \\
u3\theta_{07} & u3\theta_{08} & u3\theta_{09} & u3\theta_{10} & u3\theta_{11} & u3\theta_{12} \\
u4\theta_{07} & u4\theta_{08} & u4\theta_{09} & u4\theta_{10} & u4\theta_{11} & u4\theta_{12} \\
u5\theta_{07} & u5\theta_{08} & u5\theta_{09} & u5\theta_{10} & u5\theta_{11} & u5\theta_{12} \\
\hline
v0\theta_{07} & v0\theta_{08} & v0\theta_{09} & v0\theta_{10} & v0\theta_{11} & v0\theta_{12} \\
v1\theta_{07} & v1\theta_{08} & v1\theta_{09} & v1\theta_{10} & v1\theta_{11} & v1\theta_{12} \\
v2\theta_{07} & v2\theta_{08} & v2\theta_{09} & v2\theta_{10} & v2\theta_{11} & v2\theta_{12} \\
v3\theta_{07} & v3\theta_{08} & v3\theta_{09} & v3\theta_{10} & v3\theta_{11} & v3\theta_{12} \\
v4\theta_{07} & v4\theta_{08} & v4\theta_{09} & v4\theta_{10} & v4\theta_{11} & v4\theta_{12} \\
v5\theta_{07} & v5\theta_{08} & v5\theta_{09} & v5\theta_{10} & v5\theta_{11} & v5\theta_{12} \\
\hline
0\theta_{07} & 0\theta_{08} & 0\theta_{09} & 0\theta_{10} & 0\theta_{11} & 0\theta_{12} \\
1\theta_{07} & 1\theta_{08} & 1\theta_{09} & 1\theta_{10} & 1\theta_{11} & 1\theta_{12} \\
2\theta_{07} & 2\theta_{08} & 2\theta_{09} & 2\theta_{10} & 2\theta_{11} & 2\theta_{12} \\
3\theta_{07} & 3\theta_{08} & 3\theta_{09} & 3\theta_{10} & 3\theta_{11} & 3\theta_{12} \\
\end{array}
$$

Time ↓

$$X\theta = \int_{t=t_0}^{t=t_{1-1}} (X\omega_{DT} - X\omega_R)\, dt$$

FIG. 23a

| | | | | | | |
|---|---|---|---|---|---|---|
| Right leg HC▷ | $_0\theta_{01}$ | $_0\theta_{02}$ | $_0\theta_{03}$ | $_0\theta_{04}$ | $_0\theta_{05}$ | $_0\theta_{06}$ |
| | $_1\theta_{01}$ | $_1\theta_{02}$ | $_1\theta_{03}$ | $_1\theta_{04}$ | $_1\theta_{05}$ | $_1\theta_{06}$ |
| | $_2\theta_{01}$ | $_2\theta_{02}$ | $_2\theta_{03}$ | $_2\theta_{04}$ | $_2\theta_{05}$ | $_2\theta_{06}$ |
| | $_3\theta_{01}$ | $_3\theta_{02}$ | $_3\theta_{03}$ | $_3\theta_{04}$ | $_3\theta_{05}$ | $_3\theta_{06}$ |
| | $_4\theta_{01}$ | $_4\theta_{02}$ | $_4\theta_{03}$ | $_4\theta_{04}$ | $_4\theta_{05}$ | $_4\theta_{06}$ |
| | $_5\theta_{01}$ | $_5\theta_{02}$ | $_5\theta_{03}$ | $_5\theta_{04}$ | $_5\theta_{05}$ | $_5\theta_{06}$ |
| | $_6\theta_{01}$ | $_6\theta_{02}$ | $_6\theta_{03}$ | $_6\theta_{04}$ | $_6\theta_{05}$ | $_6\theta_{06}$ |
| | $_7\theta_{01}$ | $_7\theta_{02}$ | $_7\theta_{03}$ | $_7\theta_{04}$ | $_7\theta_{05}$ | $_7\theta_{06}$ |
| | $_8\theta_{01}$ | $_8\theta_{02}$ | $_8\theta_{03}$ | $_8\theta_{04}$ | $_8\theta_{05}$ | $_8\theta_{06}$ |
| Left leg TO▷ | $_{t0}\theta_{01}$ | $_{t0}\theta_{02}$ | $_{t0}\theta_{03}$ | $_{t0}\theta_{04}$ | $_{t0}\theta_{05}$ | $_{t0}\theta_{06}$ |
| | $_{t1}\theta_{01}$ | $_{t1}\theta_{02}$ | $_{t1}\theta_{03}$ | $_{t1}\theta_{04}$ | $_{t1}\theta_{05}$ | $_{t1}\theta_{06}$ |
| (Probable overturn | $_{t2}\theta_{01}$ | $_{t2}\theta_{02}$ | $_{t2}\theta_{03}$ | $_{t2}\theta_{04}$ | $_{t2}\theta_{05}$ | $_{t2}\theta_{06}$ |
| detection, select- | $_{t3}\theta_{01}$ | $_{t3}\theta_{02}$ | $_{t3}\theta_{03}$ | $_{t3}\theta_{04}$ | $_{t3}\theta_{05}$ | $_{t3}\theta_{06}$ |
| ing modified gait) | $_{t4}\theta_{01}$ | $_{t4}\theta_{02}$ | $_{t4}\theta_{03}$ | $_{t4}\theta_{04}$ | $_{t4}\theta_{05}$ | $_{t4}\theta_{06}$ |
| | $_{t5}\theta_{01}$ | $_{t5}\theta_{02}$ | $_{t5}\theta_{03}$ | $_{t5}\theta_{04}$ | $_{t5}\theta_{05}$ | $_{t5}\theta_{06}$ |
| Output modofied | $_{ti}\theta_{01a}$ | $_{ti}\theta_{02}$ | $_{ti}\theta_{03a}$ | $_{ti}\theta_{04}$ | $_{ti}\theta_{05}$ | $_{ti}\theta_{06a}$ |
| gait | $_{tj}\theta_{01a}$ | $_{tj}\theta_{02}$ | $_{tj}\theta_{03a}$ | $_{tj}\theta_{04}$ | $_{tj}\theta_{05}$ | $_{tj}\theta_{06a}$ |
| | $_{tk}\theta_{01a}$ | $_{tk}\theta_{02}$ | $_{tk}\theta_{03a}$ | $_{tk}\theta_{04}$ | $_{tk}\theta_{05}$ | $_{tk}\theta_{06a}$ |
| | $_{tl}\theta_{01a}$ | $_{tl}\theta_{02}$ | $_{tl}\theta_{03a}$ | $_{tl}\theta_{04}$ | $_{tl}\theta_{05}$ | $_{tl}\theta_{06a}$ |
| Left leg HC▷ | $_{u0}\theta_{01a}$ | $_{u0}\theta_{02}$ | $_{u0}\theta_{03a}$ | $_{u0}\theta_{04}$ | $_{u0}\theta_{05}$ | $_{u0}\theta_{06a}$ |
| | $_{u1}\theta_{01a}$ | $_{u1}\theta_{02}$ | $_{u1}\theta_{03a}$ | $_{u1}\theta_{04}$ | $_{u1}\theta_{05}$ | $_{u1}\theta_{06a}$ |
| | $_{u2}\theta_{01a}$ | $_{u2}\theta_{02}$ | $_{u2}\theta_{03a}$ | $_{u2}\theta_{04}$ | $_{u2}\theta_{05}$ | $_{u2}\theta_{06a}$ |
| | $_{u3}\theta_{01a}$ | $_{u3}\theta_{02}$ | $_{u3}\theta_{03a}$ | $_{u3}\theta_{04}$ | $_{u3}\theta_{05}$ | $_{u3}\theta_{06a}$ |
| | $_{u4}\theta_{01a}$ | $_{u4}\theta_{02}$ | $_{u4}\theta_{03a}$ | $_{u4}\theta_{04}$ | $_{u4}\theta_{05}$ | $_{u4}\theta_{06a}$ |
| | $_{u5}\theta_{01a}$ | $_{u5}\theta_{02}$ | $_{u5}\theta_{03a}$ | $_{u5}\theta_{04}$ | $_{u5}\theta_{05}$ | $_{u5}\theta_{06a}$ |

FIG. 23b

| | | | | | | |
|---|---|---|---|---|---|---|
| Right leg TO ▷ | v0θ01a | v0θ02 | v0θ03a | v0θ04 | v0θ05 | v0θ06a |
| | v1θ01a | v1θ02 | v1θ03a | v1θ04 | v1θ05 | v1θ06a |
| (Probable overturn | v2θ01a | v2θ02 | v2θ03a · v2θ04 | | v2θ05 | v2θ06a |
| detection, select- | v3θ01a | v3θ02 | v3θ03a | v3θ04 | v3θ05 | v3θ06a |
| ing modified gait) | v4θ01a | v4θ02 | v4θ03a | v4θ04 | v4θ05 | v4θ06a |
| | v5θ01a | v5θ02 | v5θ03a | v5θ04 | v5θ05 | v5θ06a |
| | v6θ01a | v6θ02 | v6θ03a | v6θ04 | v6θ05 | v6θ06a |
| | v7θ01a | v7θ02 | v7θ03a | v7θ04 | v7θ05 | v7θ06a |
| Output modified gait | viθ01b | viθ02 | viθ03b | viθ04 | viθ05 | viθ06b |
| | vjθ01b | vjθ02 | vjθ03b | vjθ04 | vjθ05 | vjθ06b |
| | vkθ01b | vkθ02 | vkθ03b | vkθ04 | vkθ05 | vkθ06b |
| | vlθ01b | vlθ02 | vlθ03b | vlθ04 | vlθ05 | vlθ06b |
| Right leg HC ▷ | 0θ01b | 0θ02 | 0θ03b | 0θ04 | 0θ05 | 0θ06b |
| | 1θ01b | 1θ02 | 1θ03b | 1θ04 | 1θ05 | 1θ06b |
| (repeated) | 2θ01b | 2θ02 | 2θ03b | 2θ04 | 2θ05 | 2θ06b |
| | 3θ01b | 3θ02 | 3θ03b | 3θ04 | 3θ05 | 3θ06b |
| | 4θ01b | 4θ02 | 4θ03b | 4θ04 | 4θ05 | 4θ06b |
| | 5θ01b | 5θ02 | 5θ03b | 5θ04 | 5θ05 | 5θ06b |
| | 6θ01b | 6θ02 | 6θ03b | 6θ04 | 6θ05 | 6θ06b |

FIG.23c

| v0θ07a | v0θ08 | v0θ09 | v0θ10a | v0θ11 | v0θ12a |
| v1θ07a | v1θ08 | v1θ09 | v1θ10a | v1θ11 | v1θ12a |
| v2θ07a | v2θ08 | v2θ09 | v2θ10a | v2θ11 | v2θ12a |
| v3θ07a | v3θ08 | v3θ09 | v3θ10a | v3θ11 | v3θ12a |
| v4θ07a | v4θ08 | v4θ09 | v4θ10a | v4θ11 | v4θ12a |
| v5θ07a | v5θ08 | v5θ09 | v5θ10a | v5θ11 | v5θ12a |
| v6θ07a | v6θ08 | v6θ09 | v6θ10a | v6θ11 | v6θ12a |
| v7θ07a | v7θ08 | v7θ09 | v7θ10a | v7θ11 | v7θ12a |

| viθ07b | viθ08 | viθ09 | viθ10b | viθ11 | viθ12b |
| vjθ07b | vjθ08 | vjθ09 | vjθ10b | vjθ11 | vjθ12b |
| vkθ07b | vkθ08 | vkθ09 | vkθ10b | vkθ11 | vkθ12b |
| vlθ07b | vlθ08 | vlθ09 | vlθ10b | vlθ11 | vlθ12b |

| 0θ07y | 0θ08 | 0θ09 | 0θ10b | 0θ11 | 0θ12b |
| 1θ07y | 1θ08 | 1θ09 | 1θ10b | 1θ11 | 1θ12b |
| 2θ07y | 2θ08 | 2θ09 | 2θ10b | 2θ11 | 2θ12b |
| 3θ07y | 3θ08 | 3θ09 | 3θ10b | 3θ11 | 3θ12b |
| 4θ07y | 4θ08 | 4θ09 | 4θ10b | 4θ11 | 4θ12b |
| 5θ07y | 5θ08 | 5θ09 | 5θ10b | 5θ11 | 5θ12b |
| 6θ07y | 6θ08 | 6θ09 | 6θ10b | 6θ11 | 6θ12b |

FIG. 23d

Walking direction →

FIG. 27a

Left leg joint angles

| Ankle joint for pitch direction | | | | | | Hip joint for pitch direction |
|---|---|---|---|---|---|---|
| $t0\theta_{01}$ | $t0\theta_{02}$ | $t0\theta_{03}$ | $t0\theta_{04}$ | $t0\theta_{05}$ | $t0\theta_{06}$ | |
| $t1\theta_{01}$ | $t1\theta_{02}$ | $t1\theta_{03}$ | $t1\theta_{04}$ | $t1\theta_{05}$ | $t1\theta_{06}$ | |
| $t2\theta_{01}$ | $t2\theta_{02}$ | $t2\theta_{03}$ | $t2\theta_{04}$ | $t2\theta_{05}$ | $t2\theta_{06}$ | |
| $t3\theta_{01}$ | $t3\theta_{02}$ | $t3\theta_{03}$ | $t3\theta_{04}$ | $t3\theta_{05}$ | $t3\theta_{06}$ | |
| $ti\theta_{01} - \delta\theta_1$ | $ti\theta_{02}$ | $ti\theta_{03}$ | $ti\theta_{04}$ | $ti\theta_{05}$ | $ti\theta_{06} + \delta\theta_1$ | |
| $tj\theta_{01} - \delta_1\theta_1$ | $tj\theta_{02}$ | $tj\theta_{03}$ | $tj\theta_{04}$ | $tj\theta_{05}$ | $tj\theta_{06} + \delta_1\theta_1$ | |
| $tk\theta_{01} - \delta_2\theta_1$ | $tk\theta_{02}$ | $tk\theta_{03}$ | $tk\theta_{04}$ | $tk\theta_{05}$ | $tk\theta_{06} + \delta_2\theta_1$ | |
| $tl\theta_{01} - \delta_3\theta_1$ | $tl\theta_{02}$ | $tl\theta_{03}$ | $tl\theta_{04}$ | $tl\theta_{05}$ | $tl\theta_{06} + \delta_3\theta_1$ | |
| $tm\theta_{01} - \delta_4\theta_1$ | $tm\theta_{02}$ | $tm\theta_{03}$ | $tm\theta_{04}$ | $tm\theta_{05}$ | $tm\theta_{06} + \delta_4\theta_1$ | |
| $tn\theta_{01} - \delta\theta_1$ | $tn\theta_{02}$ | $tn\theta_{03}$ | $tn\theta_{04}$ | $tn\theta_{05}$ | $tn\theta_{06} + \delta\theta_1$ | |
| $to\theta_{01} - \delta\theta_1$ | $to\theta_{02}$ | $to\theta_{03}$ | $to\theta_{04}$ | $to\theta_{05}$ | $to\theta_{06} + \delta\theta_1$ | |
| $u0\theta_{01} - \delta\theta_1$ | $u0\theta_{02}$ | $u0\theta_{03}$ | $u0\theta_{04}$ | $u0\theta_{05}$ | $u0\theta_{06} + \delta\theta_1$ | |
| $u1\theta_{01} - \delta\theta_1$ | $u1\theta_{02}$ | $u1\theta_{03}$ | $u1\theta_{04}$ | $u1\theta_{05}$ | $u1\theta_{06} + \delta\theta_1$ | |
| $u2\theta_{01} - \delta\theta_1$ | $u2\theta_{02}$ | $u2\theta_{03}$ | $u2\theta_{04}$ | $u2\theta_{05}$ | $u2\theta_{06} + \delta\theta_1$ | |
| $v0\theta_{01} - \delta\theta_1$ | $v0\theta_{02}$ | $v0\theta_{03}$ | $v0\theta_{04}$ | $v0\theta_{05}$ | $v0\theta_{06} + \delta\theta_1$ | |
| $v1\theta_{01} - \delta\theta_1$ | $v1\theta_{02}$ | $v1\theta_{03}$ | $v1\theta_{04}$ | $v1\theta_{05}$ | $v1\theta_{06} + \delta\theta_1$ | |
| $v2\theta_{01} - \delta\theta_1$ | $v2\theta_{02}$ | $v2\theta_{03}$ | $v2\theta_{04}$ | $v2\theta_{05}$ | $v2\theta_{06} + \delta\theta_1$ | |
| $v3\theta_{01} - \delta\theta_1$ | $v3\theta_{02}$ | $v3\theta_{03}$ | $v3\theta_{04}$ | $v3\theta_{05}$ | $v3\theta_{06} + \delta\theta_1$ | |
| $vg\theta_{01} - \delta_2\theta_1$ | $vg\theta_{02}$ | $vg\theta_{03}$ | $vg\theta_{04}$ | $vg\theta_{05}$ | $vg\theta_{06} + \delta_2\theta_1$ | |
| $vh\theta_{01} - \delta_1\theta_1$ | $vh\theta_{02}$ | $vh\theta_{03}$ | $vh\theta_{04}$ | $vh\theta_{05}$ | $vh\theta_{06} + \delta_1\theta_1$ | |
| $vi\theta_{01}$ | $vi\theta_{02}$ | $vi\theta_{03}$ | $vi\theta_{04}$ | $vi\theta_{05}$ | $vi\theta_{06}$ | |
| $vj\theta_{01}$ | $vj\theta_{02}$ | $vj\theta_{03}$ | $vj\theta_{04}$ | $vj\theta_{05}$ | $vj\theta_{06}$ | |
| $vk\theta_{01}$ | $vk\theta_{02}$ | $vk\theta_{03}$ | $vk\theta_{04}$ | $vk\theta_{05}$ | $vk\theta_{06}$ | |

FIG. 27b

Right leg joint angles

| Hip joint for pitch direction | | | | | Ankle joint for pitch direction |
|---|---|---|---|---|---|
| $t0\theta07$ | $t0\theta08$ | $t0\theta09$ | $t0\theta10$ | $t0\theta11$ | $t0\theta12$ |
| $t1\theta07$ | $t1\theta08$ | $t1\theta09$ | $t1\theta10$ | $t1\theta11$ | $t1\theta12$ |
| $t2\theta07$ | $t2\theta08$ | $t2\theta09$ | $t2\theta10$ | $t2\theta11$ | $t2\theta12$ |
| $t3\theta07$ | $t3\theta08$ | $t3\theta09$ | $t3\theta10$ | $t3\theta11$ | $t3\theta12$ |
| $ti\theta07$ | $ti\theta08$ | $ti\theta09$ | $ti\theta10$ | $ti\theta11$ | $ti\theta12$ |
| $tj\theta07$ | $tj\theta08$ | $tj\theta09$ | $tj\theta10$ | $tj\theta11$ | $tj\theta12$ |
| $tk\theta07$ | $tk\theta08$ | $tk\theta09$ | $tk\theta10$ | $tk\theta11$ | $tk\theta12$ |
| $tl\theta07$ | $tl\theta08$ | $tl\theta09$ | $tl\theta10$ | $tl\theta11$ | $tl\theta12$ |
| $tm\theta07$ | $tm\theta08$ | $tm\theta09$ | $tm\theta10$ | $tm\theta11$ | $tm\theta12$ |
| $tn\theta07$ | $tn\theta08$ | $tn\theta09$ | $tn\theta10$ | $tn\theta11$ | $tn\theta12$ |
| $to\theta07$ | $to\theta08$ | $to\theta09$ | $to\theta10$ | $to\theta11$ | $to\theta12$ |
| $u0\theta07$ | $u0\theta08$ | $u0\theta09$ | $u0\theta10$ | $u0\theta11$ | $u0\theta12$ |
| $u1\theta07$ | $u1\theta08$ | $u1\theta09$ | $u1\theta10$ | $u1\theta11$ | $u1\theta12$ |
| $u2\theta07$ | $u2\theta08$ | $u2\theta09$ | $u2\theta10$ | $u2\theta11$ | $u2\theta12$ |
| $v0\theta07$ | $v0\theta08$ | $v0\theta09$ | $v0\theta10$ | $v0\theta11$ | $v0\theta12$ |
| $v1\theta07$ | $v1\theta08$ | $v1\theta09$ | $v1\theta10$ | $v1\theta11$ | $v1\theta12$ |
| $v2\theta07$ | $v2\theta08$ | $v2\theta09$ | $v2\theta10$ | $v2\theta11$ | $v2\theta12$ |
| $v3\theta07$ | $v3\theta08$ | $v3\theta09$ | $v3\theta10$ | $v3\theta11$ | $v3\theta12$ |
| $vg\theta07$ | $vg\theta08$ | $vg\theta09$ | $vg\theta10$ | $vg\theta11$ | $vg\theta12$ |
| $vh\theta07$ | $vh\theta08$ | $vh\theta09$ | $vh\theta10$ | $vh\theta11$ | $vh\theta12$ |
| $vi\theta07$ | $vi\theta08$ | $vi\theta09$ | $vi\theta10$ | $vi\theta11$ | $vi\theta12$ |
| $vj\theta07$ | $vj\theta08$ | $vj\theta09$ | $vj\theta10$ | $vj\theta11$ | $vj\theta12$ |
| $vk\theta07$ | $vk\theta08$ | $vk\theta09$ | $vk\theta10$ | $vk\theta11$ | $vk\theta12$ |

FIG. 30a

Left leg joint angles

| Ankle joint for pitch direction | | | | | Hip joint for pitch direction |
|---|---|---|---|---|---|
| $t0\theta01$ | $t0\theta02$ | $t0\theta03$ | $t0\theta04$ | $t0\theta05$ | $t0\theta06$ |
| $t1\theta01$ | $t1\theta02$ | $t1\theta03$ | $t1\theta04$ | $t1\theta05$ | $t1\theta06$ |
| $t2\theta01$ | $t2\theta02$ | $t2\theta03$ | $t2\theta04$ | $t2\theta05$ | $t2\theta06$ |
| $t3\theta01$ | $t3\theta02$ | $t3\theta03$ | $t3\theta04$ | $t3\theta05$ | $t3\theta06$ |
| $ti\theta01 \div 1$ | $ti\theta02$ | $ti\theta03$ | $ti\theta04$ | $ti\theta05$ | $ti\theta06 \times 1$ |
| $tj\theta01 \div {}_1k_1$ | $tj\theta02$ | $tj\theta03$ | $tj\theta04$ | $tj\theta05$ | $tj\theta06 \times {}_1k_1$ |
| $tk\theta01 \div {}_2k_1$ | $tk\theta02$ | $tk\theta03$ | $tk\theta04$ | $tk\theta05$ | $tk\theta06 \times {}_2k_1$ |
| $tl\theta01 \div {}_3k_1$ | $tl\theta02$ | $tl\theta03$ | $tl\theta04$ | $tl\theta05$ | $tl\theta06 \times {}_3k_1$ |
| $tm\theta01 \div {}_4k_1$ | $tm\theta02$ | $tm\theta03$ | $tm\theta04$ | $tm\theta05$ | $tm\theta06 \times {}_4k_1$ |
| $tn\theta01 \div k_1$ | $tn\theta02$ | $tn\theta03$ | $tn\theta04$ | $tn\theta05$ | $tn\theta06 \times k_1$ |
| $to\theta01 \div k_1$ | $to\theta02$ | $to\theta03$ | $to\theta04$ | $to\theta05$ | $to\theta06 \times k_1$ |
| $u0\theta01 \div k_1$ | $u0\theta02$ | $u0\theta03$ | $u0\theta04$ | $u0\theta05$ | $u0\theta06 \times k_1$ |
| $u1\theta01 \div k_1$ | $u1\theta02$ | $u1\theta03$ | $u1\theta04$ | $u1\theta05$ | $u1\theta06 \times k_1$ |
| $u2\theta01 \div k_1$ | $u2\theta02$ | $u2\theta03$ | $u2\theta04$ | $u2\theta05$ | $u2\theta06 \times k_1$ |
| $v0\theta01 \div k_1$ | $v0\theta02$ | $v0\theta03$ | $v0\theta04$ | $v0\theta05$ | $v0\theta06 \times k_1$ |
| $v1\theta01 \div k_1$ | $v1\theta02$ | $v1\theta03$ | $v1\theta04$ | $v1\theta05$ | $v1\theta06 \times k_1$ |
| $v2\theta01 \div k_1$ | $v2\theta02$ | $v2\theta03$ | $v2\theta04$ | $v2\theta05$ | $v2\theta06 \times k_1$ |
| $v3\theta01 \div k_1$ | $v3\theta02$ | $v3\theta03$ | $v3\theta04$ | $v3\theta05$ | $v3\theta06 \times k_1$ |
| $vg\theta01 \div {}_2k_1$ | $vg\theta02$ | $vg\theta03$ | $vg\theta04$ | $vg\theta05$ | $vg\theta06 \times {}_2k_1$ |
| $vh\theta01 \div {}_1k_1$ | $vh\theta02$ | $vh\theta03$ | $vh\theta04$ | $vh\theta05$ | $vh\theta06 \times {}_1k_1$ |
| $vi\theta01 \div 1$ | $vi\theta02$ | $vi\theta03$ | $vi\theta04$ | $vi\theta05$ | $vi\theta06 \times 1$ |
| $vj\theta01$ | $vj\theta02$ | $vj\theta03$ | $vj\theta04$ | $vj\theta05$ | $vj\theta06$ |
| $vk\theta01$ | $vk\theta02$ | $vk\theta03$ | $vk\theta04$ | $vk\theta05$ | $vk\theta06$ |

FIG. 30b

Right leg joint angles

| Hip joint for pitch direction | | | | | Ankle joint for pitch direction |
|---|---|---|---|---|---|
| $t0\theta07$ | $t0\theta08$ | $t0\theta09$ | $t0\theta10$ | $t0\theta11$ | $t0\theta12$ |
| $t1\theta07$ | $t1\theta08$ | $t1\theta09$ | $t1\theta10$ | $t1\theta11$ | $t1\theta12$ |
| $t2\theta07$ | $t2\theta08$ | $t2\theta09$ | $t2\theta10$ | $t2\theta11$ | $t2\theta12$ |
| $t3\theta07$ | $t3\theta08$ | $t3\theta09$ | $t3\theta10$ | $t3\theta11$ | $t3\theta12$ |
| $ti\theta07$ | $ti\theta08$ | $ti\theta09$ | $ti\theta10$ | $ti\theta11$ | $ti\theta12$ |
| $tj\theta07$ | $tj\theta08$ | $tj\theta09$ | $tj\theta10$ | $tj\theta11$ | $tj\theta12$ |
| $tk\theta07$ | $tk\theta08$ | $tk\theta09$ | $tk\theta10$ | $tk\theta11$ | $tk\theta12$ |
| $tl\theta07$ | $tl\theta08$ | $tl\theta09$ | $tl\theta10$ | $tl\theta11$ | $tl\theta12$ |
| $tm\theta07$ | $tm\theta08$ | $tm\theta09$ | $tm\theta10$ | $tm\theta11$ | $tm\theta12$ |
| $tn\theta07$ | $tn\theta08$ | $tn\theta09$ | $tn\theta10$ | $tn\theta11$ | $tn\theta12$ |
| $to\theta07$ | $to\theta08$ | $to\theta09$ | $to\theta10$ | $to\theta11$ | $to\theta12$ |
| $u0\theta07$ | $u0\theta08$ | $u0\theta09$ | $u0\theta10$ | $u0\theta11$ | $u0\theta12$ |
| $u1\theta07$ | $u1\theta08$ | $u1\theta09$ | $u1\theta10$ | $u1\theta11$ | $u1\theta12$ |
| $u2\theta07$ | $u2\theta08$ | $u2\theta09$ | $u2\theta10$ | $u2\theta11$ | $u2\theta12$ |
| $v0\theta07$ | $v0\theta08$ | $v0\theta09$ | $v0\theta10$ | $v0\theta11$ | $v0\theta12$ |
| $v1\theta07$ | $v1\theta08$ | $v1\theta09$ | $v1\theta10$ | $v1\theta11$ | $v1\theta12$ |
| $v2\theta07$ | $v2\theta08$ | $v2\theta09$ | $v2\theta10$ | $v2\theta11$ | $v2\theta12$ |
| $v3\theta07$ | $v3\theta08$ | $v3\theta09$ | $v3\theta10$ | $v3\theta11$ | $v3\theta12$ |
| $vg\theta07$ | $vg\theta08$ | $vg\theta09$ | $vg\theta10$ | $vg\theta11$ | $vg\theta12$ |
| $vh\theta07$ | $vh\theta08$ | $vh\theta09$ | $vh\theta10$ | $vh\theta11$ | $vh\theta12$ |
| $vi\theta07 \times 1$ | $vi\theta08$ | $vi\theta09$ | $vi\theta10$ | $vi\theta11$ | $vi\theta12 \div 1$ |
| $vj\theta07 \times {}_2k_2$ | $vj\theta08$ | $vj\theta09$ | $vj\theta10$ | $vj\theta11$ | $vj\theta12 \div {}_2k_2$ |
| $vk\theta07 \times {}_1k_2$ | $vk\theta08$ | $vk\theta09$ | $vk\theta10$ | $vk\theta11$ | $vk\theta12 \div {}_1k_2$ |

SYSTEM FOR CONTROLLING LOCOMOTION OF LEGGED WALKING ROBOT

BACKGROUND OF THE INVENTION

1. Field of the Invention

This invention relates to a system for controlling the locomotion of a legged walking robot and, more particularly, to a system for controlling the locomotion of a biped walking robot or the like which is able to walk stably over rough terrain.

2. Description of the Prior Art

Two methods have been developed for achieving walking of a legged walking robot. One is the method disclosed, for example, in Japanese Laid-open Patent Publication No. 62-97006 in which data for driving the robot's leg joints is calculated in advance using a large off-board computer and stored in the memory of a computer mounted on the robot for output by the computer during robot locomotion. The other is the method described in, for example, "Legged Robots on Rough Terrain: Experiments in Adjusting Step Length: IEEE 1988, by Jessica Hodgins" in which the robot is equipped with a high-performance on-board computer which calculates the optimum joint angles in real time during robot locomotion and controls the joint drive motors to obtain the calculated angles.

While the first method has the advantage of not requiring a sophisticated on-board computer, the fact that the locomotion data is calculated in advance makes it workable only if the conditions encountered during actual walking are completely identical to those envisioned in advance. The method is thus not capable of coping with unforeseen conditions arising in the course of actual walking and, in particular, cannot effectively deal with unexpected undulations and irregularities in the terrain being traversed. Having a high center of gravity and feet with small ground contact areas, a biped robot is physically unstable. For such a robot to walk stably, it is necessary to ensure that the resultant of the weight acting on the robot's center of gravity and the inertial force falls within the ground contact area of the supporting leg. While the weight does not change, the robot's locomotion causes the inertial force to vary constantly in a pattern which repeats in time and space at regular periods insofar as the conditions external to the robot remain constant. The conditions external of the robot are, however, not constant and there are moment-to-moment changes in the terrain in the form of varying inclination, undulations, bumps and the like, as well as changes in the terrain hardness and other physical factors. Since these variations cause changes in the reactive force the robot receives at the time of free leg footfall, they destabilize the robots locomotion. While of less importance than the external condition changes, changes in the internal conditions of the robot can also have a destabilizing effect. For example, friction at the joints varies with the state of shock absorption, and the flexing of mechanical components due to insufficient stiffness can also have an effect. It is impossible to cope with such changes using pre-calculated data.

In stabilizing locomotion in the second method, once the state of the robot has been ascertained, it is then necessary to conduct a series of real-time processing operations which include solving highly complex determinants for deciding the gait, calculating optimum location for the next foot placement and driving the free leg for actually placing the foot at the calculated location. In the case of the biped walking robot whose legs each have six degrees of freedom therefore, the large determinants that have to be solved for conducting the control make it necessary to use a very large, high-performance computer. Thus the second method requires the robot to be equipped with a high-speed, high-performance computer, its power consumption is high and the computer itself is large, heavy and expensive. These are disadvantages that are hard to tolerate in a walking robot.

The first object of this invention is therefore to provide a system for controlling the locomotion of a legged walking robot which overcomes the aforesaid drawbacks of the prior art by retaining the advantages that the first method realizes by controlling walking on the basis of data calculated offline in advance while, at the same time, enabling the flexible response to unforeseen changes in locomotion conditions that is required for achieving stable walking.

There is no difference in the likelihood of changes arising in the terrain conditions between the first method of controlling locomotion on the basis of data calculate offline in advance and the second method of deciding the optimum gait in real time. Moreover, even the second method is not necessarily able to cope quickly enough with changes in the locomotion conditions that arise suddenly, and in this sense, therefore, the problems of the first method are also problems of the second method.

The second object of the invention is therefore to provided a system for controlling the locomotion of a legged walking robot which is able to stabilize the attitude of the robot by quickly coping with sudden changes in terrain conditions, irrespective of which of the aforesaid two methods is employed.

The third object of the invention is to provide a system for controlling the locomotion of a legged walking robot which overcomes the aforesaid drawbacks by combining the advantages of the aforesaid two methods and, more specifically, to provide such a system wherein the gait is set offline in advance and the set gait can be readily modified for restoring walking stability when unexpected walking conditions are encountered during actual walking.

The offline setting of a target gait in advance may involve not only the determination of detailed settings such as the aforesaid joint angles but also the setting of such higher level data such as the foot placement position and the position of the center of gravity. Moreover, even in a method which determines the gait in real time during walking, it is not possible to avoid being forced to modify the gait upon encountering sudden, unexpected changes in the walking conditions.

The fourth object of the invention is therefore to provide a system for controlling the locomotion of a legged walking robot enabling the gait to be readily modified in response to unexpected changes in the walking conditions irrespective of whether or not locomotion data has been set offline in advance.

Moreover, recent years have seen extensive research into stabilization methods for robots (including legged walking robots) in which the robot's linkages are subjected to kinematic analysis, the robot's behavior is reduced to mathematical equations using various control theories falling in the realm of modern control system theory, and the equations are solved for obtaining control values. However, although the use of modern control system theory makes it possible to obtain very precise control values, the large number of determinants that have to be solved for implementing this type of control require the robot to be equipped with a high-performance computer. Moreover, since it is impossible to fully ascertain the rigidity etc. of the linkages, the results obtained through the application of the theory have been small in proportion to the amount of effort made.

The fifth object of the invention is therefore to provide a system for controlling the locomotion of a legged walking robot which is capable quickly responding to unexpected changes in the locomotion conditions for restoring the postural stability of the robot in a simple manner and which can be implemented using a relatively low-performance on-board computer.

SUMMARY OF THE INVENTION

This invention achieves these objects by providing a system for controlling locomotion of a legged walking robot having a body link and a plurality of leg linkage each connected to the body link and each including at least one drive joint connecting an upper link and a lower link thereof. The system comprises first means for predicting the probability that the robot could turn over, servo control means for determining a control value of the drive joint to follow up a target value, and second means for determining drive speed of the joint in response to the predicted robot turnover probability.

BRIEF EXPLANATION OF THE DRAWINGS

These and other objects and advantages of the invention will be more apparent from the following description and drawings, in which:

FIG. 2 is a side view and shows the structural arrangement the knee on down of the robot illustrated schematically in FIG. 1;

FIG. 3 is a sectional view taken along line III—III of FIG. 2;

FIGS. 5a and 5b are flowchart showing the operation of the control unit of FIG. 4;

FIG. 15 is an explanatory view similar to FIG. 9, but shows a manner of the stability control according to the second embodiment of the present invention;

FIG. 16 is an explanatory view similar to FIG. 9, but shows a manner of the stability control according to the third embodiment of the present invention;

FIG. 17 is an explanatory view similar to FIG. 11, but also shows a manner of the stability control according to the third embodiment of the present invention;

FIGS. 18a and 18b are flowchart similar to FIGS, 5a and 5b but show the fourth embodiment of the present invention;

FIGS. 19, 19a and 19b are data showing a predetermined gait established by an offline computer in the terms of joint angles;

Figure 23D:
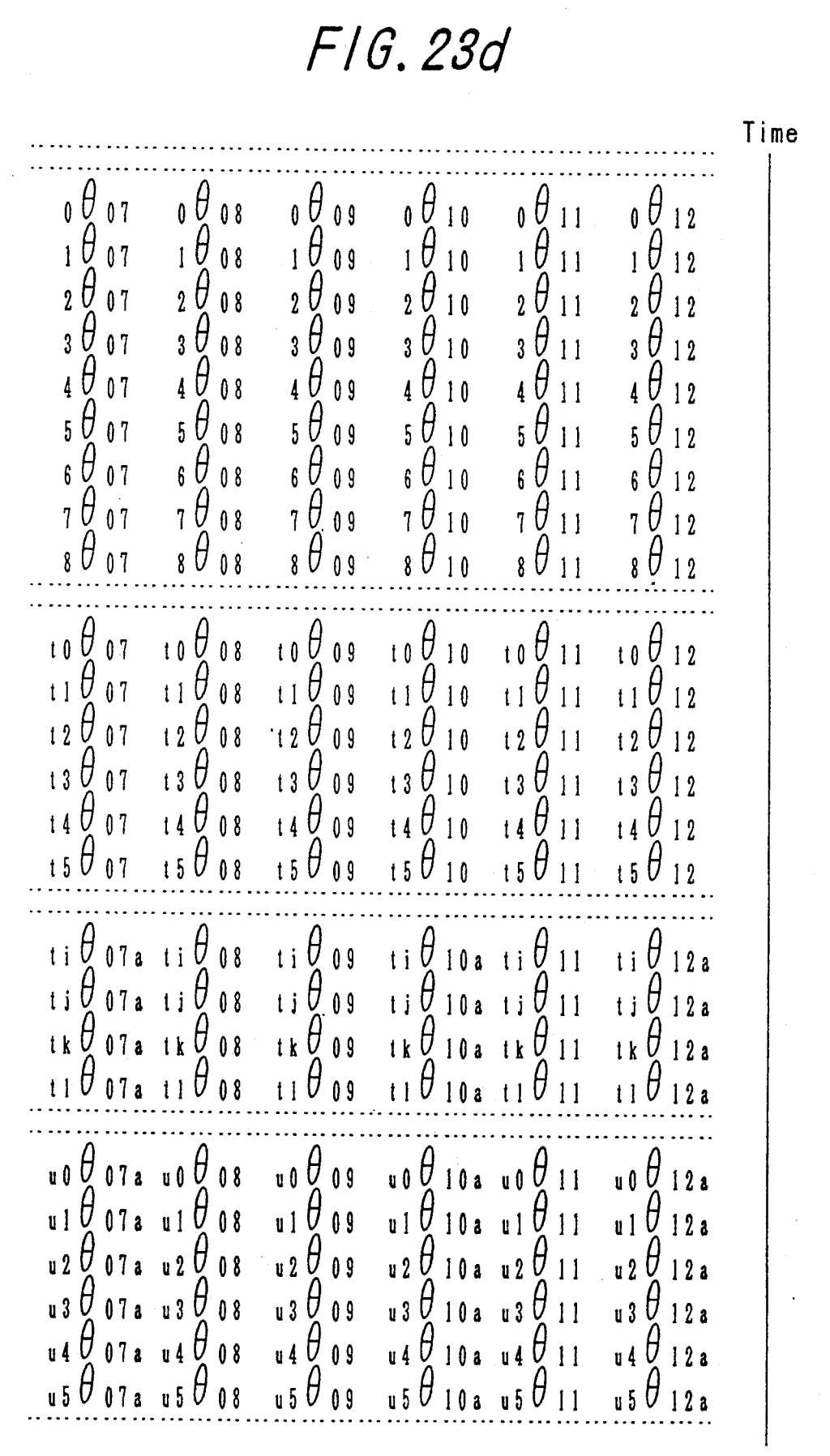

FIGS. 23, 23a–23d are data showing a modified gait of the FIGS. 19a–19d gait for realizing changing footfall positions shown in FIG. 21;

FIG. 27, 27a–27d are data showing a modified gait of the FIGS. 19, 19a–19b gait carried out in the fifth embodiment;

FIG. 30, 30a–30b are data showing a modified gait of the FIGS. 19, 19a–19b gait according to the sixth embodiment.

DETAILED DESCRIPTION OF THE INVENTION

Figure 1:
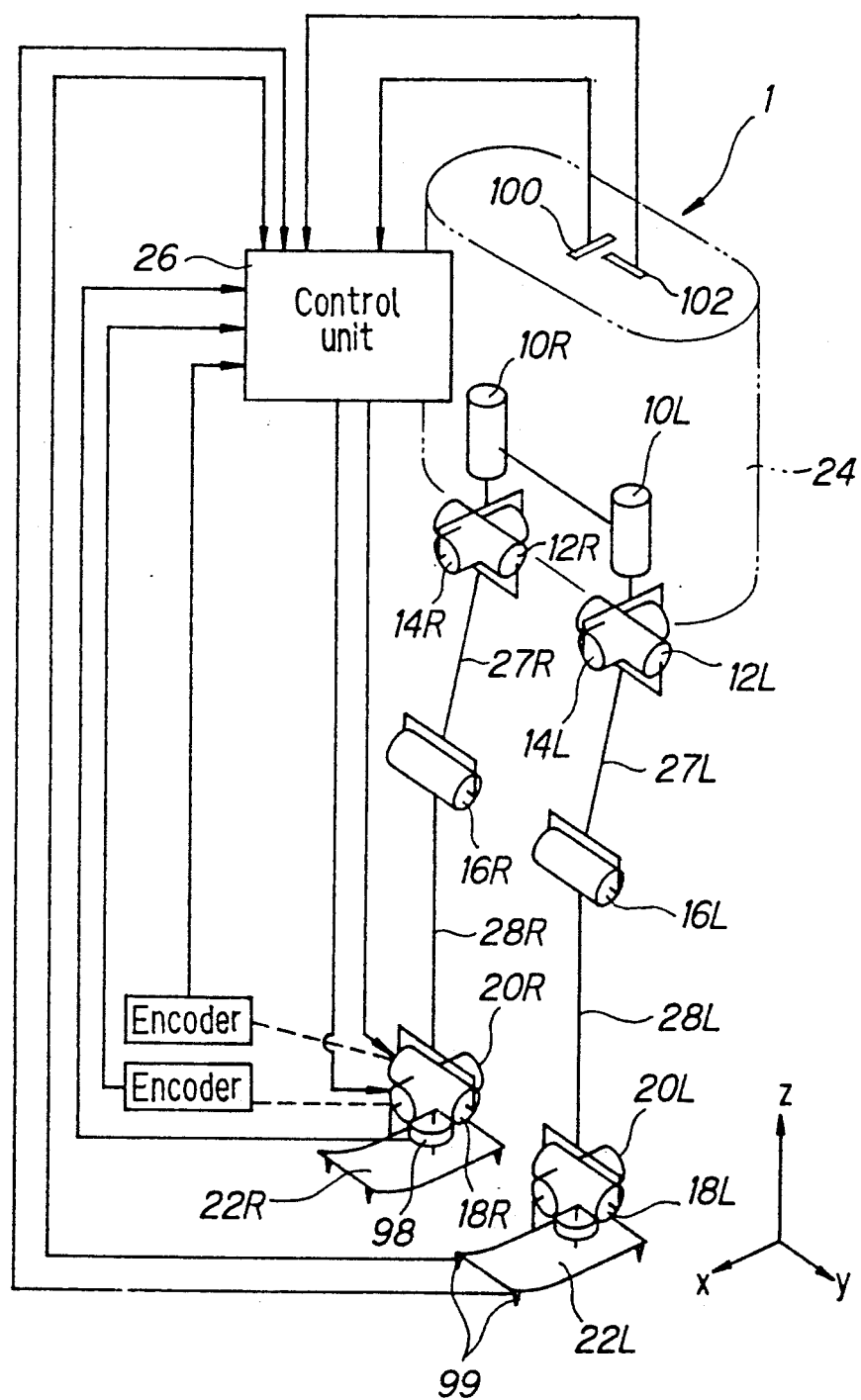
FIG. 1 is an overall skeleton view of a biped walking robot according to the present invention.

The invention will now be explained with reference to a biped walking robot as a specific embodiment of a legged walking robot. An overall skeleton view of the biped walking robot is shown in FIG. 1. The robot, designated by reference numeral 1 is provided with six joints (axes) on each of its right (R) and left (L) legs. From the top down, these joints (axes) are hip turning joints (axes) 10R, 10L, hip pitch direction joints (axes) 12R, 12L, hip roll direction joints (axes) 14R, 14L, knee pitch direction joints (axes) 16R, 16L, ankle pitch direction joints (axes) 18R, 18L, and ankle roll direction joints (axes) 20R, 20L. The pitch direction is the direction indicated by "x" and the roll direction is the direction indicated by "y" as shown in the right bottom of the figure. Feet 22R, 22L are attached below and a body (main unit) 24 is disposed at the uppermost position. The body 24 houses a control unit 26.

In this arrangement, joints (axes) 10R (L), 12R (L) and 14R (L) together constitute a right (left) hip joint. The three axes meet at a single point. The joints (axes) 18R (L) and 20R (L) together form a right (left) ankle, wherein these two axes also intersect perpendicularly. The three pitch direction joints (axes) 12R (L), 16R (L) and 18R (L) are mutually parallel and the positional relationship thereamong remains unchanged irrespective of the behavior of the other joints (axes). As illustrated, each leg has six degrees of freedom and each foot 22R (L) ca be placed at the desired position in the desired direction irrespective of the fact that it is attached to the body 24. Specifically, during walking the legs as a whole can be moved as desired by appropriately driving the 12 (6×2) joints (axes) for varying their individual angles, thus enabling desired walking in three-dimensional space. The hip joints and the knee joints are connected by thigh linkages 27R, 27L and the knee joints and ankle joints are connected by crus linkages 28R, 28L.

The joints are constituted mainly of motors and reduction gear mechanisms. The arrangement of the knee will now be explained in detail with reference to FIGS. 2 and 3. Although a detailed description of the hip joints will not be given, it should be understood that they are of a similar structure to the knees. As the left and right legs are laterally symmetrical, only the right leg will be explained in the following.

Referring to FIGS. 2 and 3 the output of a motor (not shown) mounted at an intermediate portion of the thigh linkage 27R is transmitted via a belt 82 to the input shaft of a harmonic reduction gear 84 installed at the knee joint (axis) 16R. The upper end of the crus linkage 28R is formed with a recess 87 which accommodates a motor 88, the output of which is input through a belt 90 to a harmonic reduction gear 92 provided at the ankle, whereby the right foot member 22R is driven in the pitch direction about the axis 18R. The foot 22R is further arranged to swing freely in the roll direction about the axis 20R perpendicularly intersecting the axis 18R. For this purpose, there is provided a harmonic reduction gear 94 and a motor 96 for supplying power directly thereto. Each of the motors is provided with a rotary encoder. (Only the rotary encoder 89 for the motor 88 is shown in the drawings.)

The ankle is further provided with a six-dimensional force and torque sensor 98 for measuring the x, v and z components transmitted to the robot through the foot and also separately measuring the three directional components of the moment, so as to detect whether or not the foot has landed and the force acting on the supporting leg. The bottom of the foot is approximately flat and is provided with elastic members 220 made of rubber or the like for absorbing the impact received at time the foot touches down. The four corners of the foot bottom are further provided with ground contact switches 99 (no shown in FIGS. 2 and 3) of conventional design for detecting contact between the foot and ground. Further, as shown in FIG. 1, a pair of inclination angle sensors 100, 102 are provided at an appropriate location on the body 24 for detecting (a) the amount of angle and angular velocity of the inclination relative to the z-axis in the x-z plane and (b) the amount of angle and angular velocity of the inclination relative to the z-axis in the y-z plane. The outputs of the inclination angle sensors 100, 102 are sent to the control unit 26 housed in the body 24.

Figure 4:
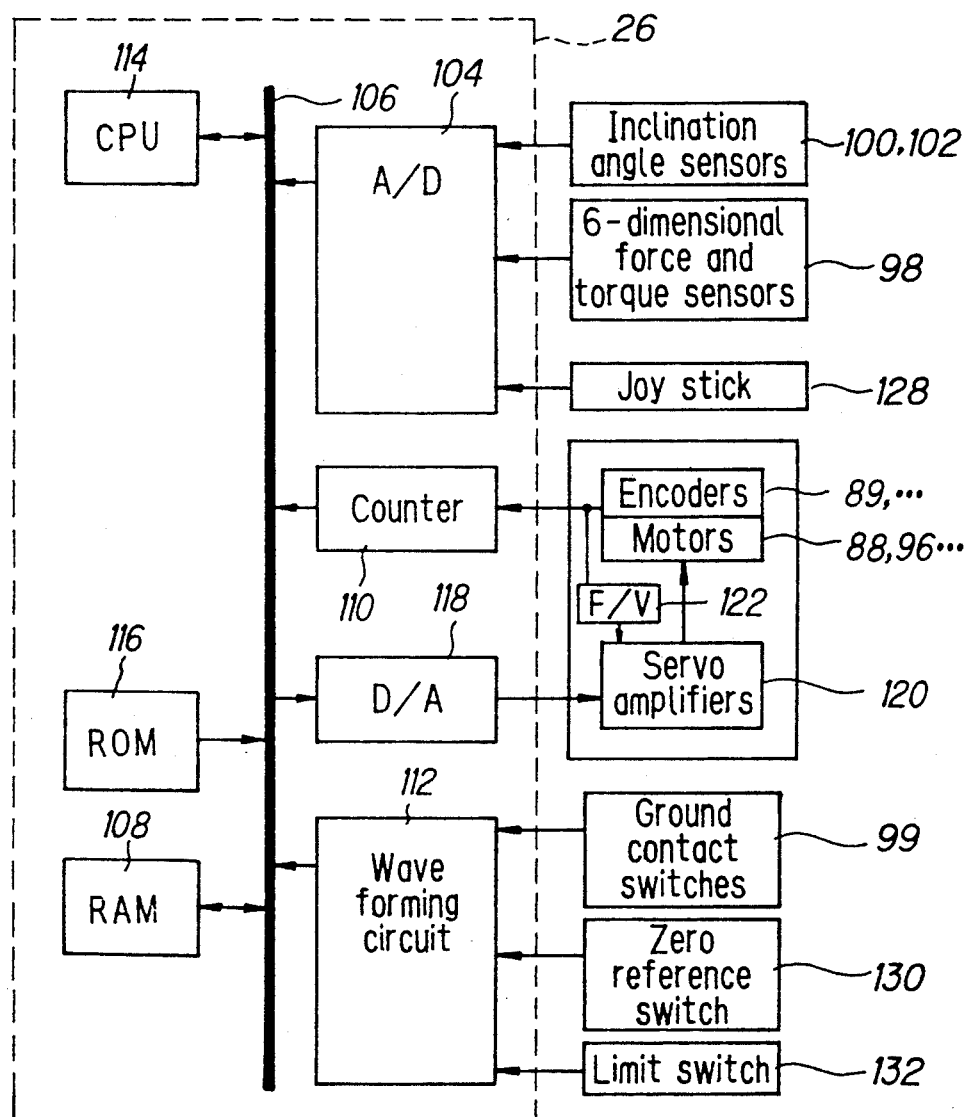
FIG. 4 is a detailed block diagram of the control unit shown in FIG. 1.

As shown in the detailed block diagram of FIG. 4, the control unit 26 is constituted as a microcomputer. Here the outputs of the inclination angle sensors 100, 102 etc. are converted to digital values in an A/D converter 104, the output of which is forwarded to a RAM (random access memory) 108 via a bus 106. The outputs of the encoder 89 etc. are sent to the RAM 108 through a counter 110 and the outputs of the ground contact switches 99 etc. are passed through a wave forming circuit 112 and stored in the RAM 108. The control unit has a CPU (central processing unit) 114 which, in the manner to be explained later, reads in the stored locomotion data, calculates speed control commands on the basis of the deviation between the stored locomotion data and measured values received from the counter 110, and forwards the calculated speed control commands through a D/A converter 118 to a servo amplifier 120 for each respective motor. The encoder output is further sent through an F/V converter 122 to the servo amplifier 120, whereby a minor loop for speed feedback control is established in each motor. Reference numeral 128 designates a joy stick, 130 a zero reference switch for determining the origin (upright) posture, and 132 a limit switch for preventing overrun.

The operation of the control system will now be explained with reference to the flowchart of FIG. 5. The control shown in this figure assumes offline setting of the target joint angles in advance and the use of virtual compliance control technique, referred in "Virtual compliance control of multi-degree-of-freedom robots" in collected papers of the Measurement and Automatic Control Society, Vol.22. No.3, March 1986.

The operation commences with step S10 in which the various sections of the system are initialized and then moves to step S12 where a locomotion pattern $i\theta t$ is retrieved. This pattern indicates the joint angle target values for walking of the robot over an ideal flat surface of uniform hardness. The prefix "i" indicates the joint number and the suffix "t" indicates the joint angle at time "t". The joints are numbered from the bottom up as $20R=1, 20L=2, \ldots$. These time series data are calculated in advance using a large computer and stored in a ROM 116 of the microcomputer.

The procedure then advances to step S14 in which the parameters kp, kv . . . are read in. These are feedback gains which will be explained in detail later. In the following step S16 the timer value t, the counter value COUNT and the joint number (counter) value i are reset to zero, whereafter walking is started in step S18 and the value of the counter for counting the joint numbers is set to 1 at step S20. The operation then advances to step S22 in which the parameters for the joint angle $i\theta t$ (i=1) etc. corresponding to the currently set joint number are retrieved from memory. The notation $i\theta t+1$ appearing in the flowchart indicates the target joint angle for the time t+1 following the current time t, namely for time at which the next program cycle begins. A value omega Dt indicates the target angular velocity (to be explained later). And Ft(omega w) is a flag which indicates the two-leg support period, Ft(omega s) a flag indicating the one-leg support period, and Ft(C) a flag indicating the impact absorption control period. The microcomputer determines when the procedure is in this period on the basis of the outputs from the respective six-dimensional force and torque sensor 98 and the like and sets the flag bit to 1 at this time.

Figure 6:
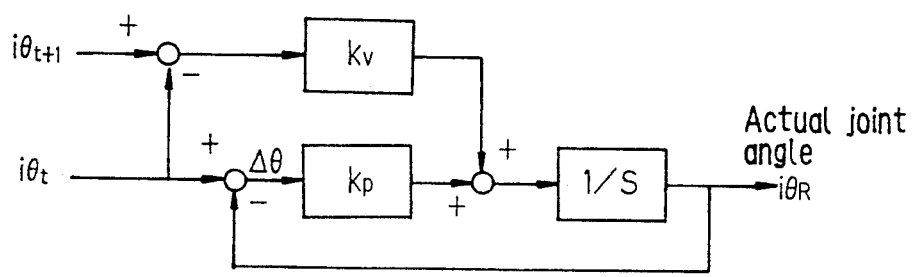
FIG. 6 is a block diagram showing control algorithm on drive joints other than ankle joints carried out in procedures in the flowchart of FIG. 5.

Next, in step S24, the outputs of the inclination sensors etc. are read in. Here a value $i\theta R$ indicates the actual angle of i-th joint, omega R the actual inclination angular velocity, and M the actual moment acting on the foot. The operation then advances to step S26 in which the position feedback control value iV1 is calculated and to step S28 in which the speed feedback (forward) control value iV2 is calculated. In other words, as shown in FIG. 6, in the control system according to the invention there is output to the servo amplifier 120 concerned a speed control value equal to the sum of a feedback value obtained by multiplying the deviation delta $\theta$ between the joint angle command value $i\theta t$ and the actual joint angle $i\theta R$ by a proportional gain kp and a feedback value obtained by multiplying the deviation between the joint angle command value $i\theta t$ at time t and the joint angle command value $i\theta t+1$ at time $t+1$ by a gain kv. It should be noted, however, that the block diagram of FIG. 6 relates to the joints other than the ankle joints and that, as shown in the block diagram of FIG. 7, in the case of the ankle joints there are also fed back control values based on compliance control and the like. This will be explained in more detail later.

Figure 7:
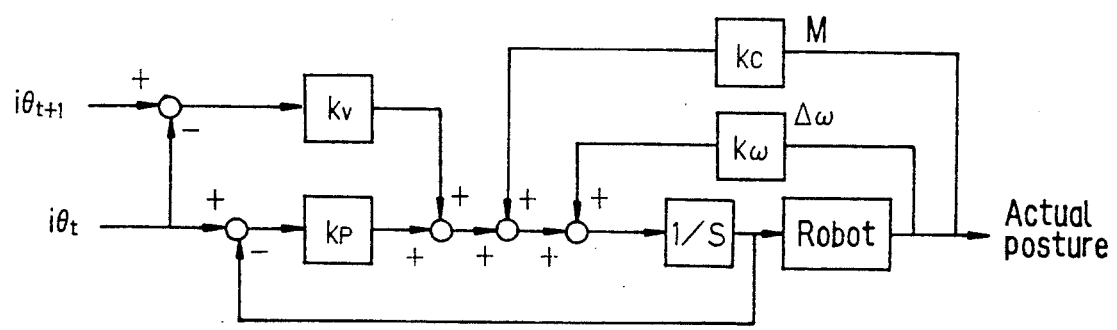
FIG. 7 is a block diagram similar to FIG. 6, but shows control algorithm on the ankle joints.

The operation then advances to step S30 in which discrimination is made as to whether or not the joint number has become 5 or greater, namely as to whether or not the control value of other than the ankle joints is in the process of being calculated, and since the result is of course negative, the procedure moves onto step S32 and the ensuing steps in which, first, inclination angular velocity feedback and the like are carried out. Specifically, in steps S32 to S34 it is discriminated whether the flag Ft(omega w) or flag Ft(omega s) is on (whether the robot is in a two-leg support state or a one-leg support state) and, based on the result of this discrimination, the procedure advances to step S36 or S38 in which a third speed feedback control value iV3 is calculated, as shown in FIG. 7, by multiplying the deviation delta omega between the target inclination angular velocity omega Dt and the actual inclination angular velocity omega R by gain k omega.

Figure 8:
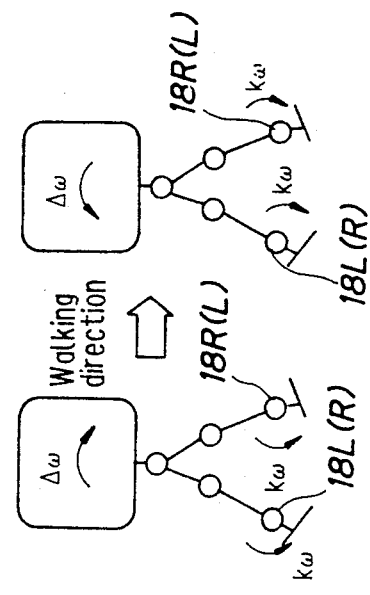
FIG. 8 is an explanatory view viewed from the front of the robot and showing a manner of stability control according to the first embodiment of the invention carried out in the FIG. 5 flowchart in a two-leg support phase.
Figure 9:
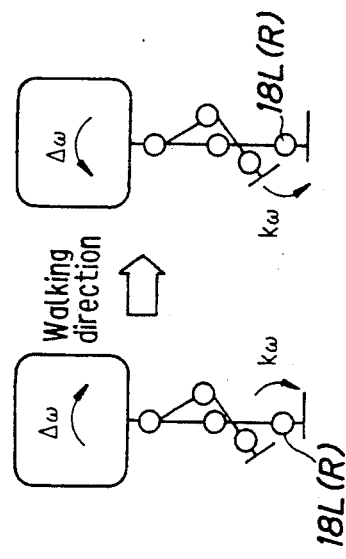
FIG. 9 is an explanatory view similar to FIG. 8, but viewed from the side of the robot.
Figure 10:
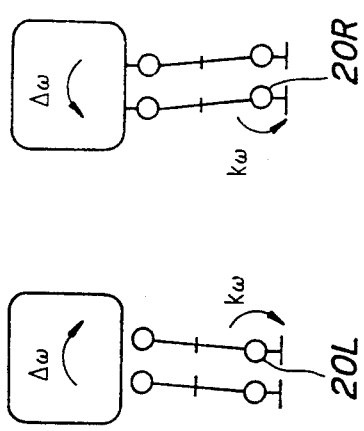
FIG. 10 is an explanatory view similar to FIG. 8, but viewed from the front of the robot and shows a manner of the stability control carried out in an one-leg support phase.
Figure 11:
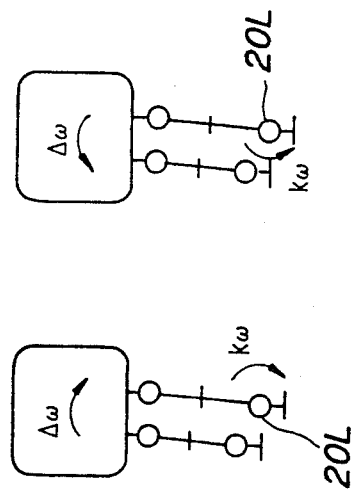
FIG. 11 is an explanatory view similar to FIG. 10, but viewed from the side of the robot.

This will now be explained in more detail. In this control, when it is detected that the inclination angular velocity deviates from the target value, it is judged that there is a probability of the robot overturning. In response, the ankle joints of the supporting leg are driven by an amount equal to the product of the inclination angular velocity deviation and a prescribed coefficient (gain k omega) so as to develop a reactive force against the ground that is proportional to the predicted probability of overturn and thus correct the postural instability of the robot. The gain k omega is defined as shown in FIGS. 8 and 9 for the two-leg support periods and as shown in FIGS. 10 and 11 for the one-leg support periods. FIG. 8 illustrates inclination angular velocity deviations delta omega acting on the robot as viewed from the front. The directions of the velocity command values to be fed back in these cases are defined as shown in these figures. Specifically, the gain k omega is set at zero for whichever of the roll direction ankle joints 20R, 20L tends to rise off the ground owing to the action of the inclination deviation delta omega and the gain for the other ankle joint which is under heavier load is set in the direction indicated in the drawings.

FIG. 9 is a side view of the robot. When an inclination angular velocity acts on the robot in the direction tending to cause it to topple forward as indicated in FIG. 9 in its left, the gain for the pitch direction ankle joint 18R (L) of the forward leg is set in the direction for causing th heel of the forward foot to kick the ground and, at the same time, the gain for the joint 18L (R) of the rearward leg is set in the direction for causing the toe of the rearward foot to rise. On the other hand, in response to an inclination angular velocity tending to cause the robot to topple backwards, the gain for the ankle joint 18L (R) is set for causing the toe of the rearward foot to kick the ground and that for the ankle joint 18R (L) of the forward leg is simultaneously set for causing the heel of the rearward foot to rise, as shown in FIG. 9 in its right.

FIG. 10 is a front view of the robot during a one-leg support period. At this time the sign of the gain k omega is set so as to drive the ankle joint 20L of the supporting leg in the indicated direction. Adjustment of the ankle joints on the free leg side at this time is optional. FIG. 11 is a side view of the robot during a one-leg support period. At this time the gain k omega is set for the ankle joint 18L (R) of the supporting leg in the indicated direction. Adjustment on the free leg side is again optional.

Figure 12:
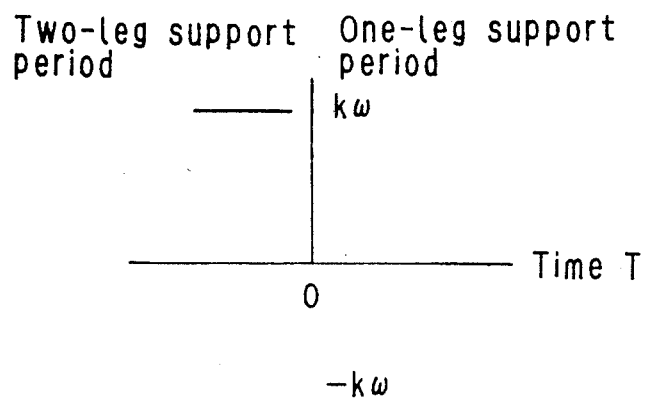
FIG. 12 is a graph showing characteristics of a feedback gain used in the stability control.
Figure 13:
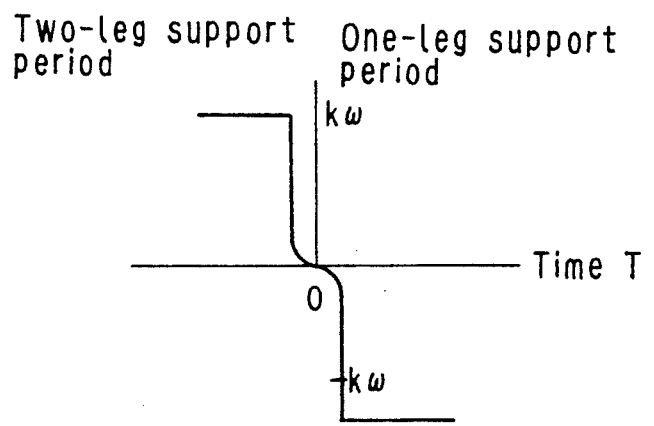
FIG. 13 is a graph showing another characteristic of the feedback gain used in the stability control.

FIG. 12 is a graph showing an example of the characteristics of the gain k omega. In this example, the absolute value of the gain k omega is constant and only the sign is changed in the manner described in the foregoing. Alternatively, the absolute value can also be varied among the different states discussed above. The same gain is used for all joints, however. In the case of FIG. 12, the sign of the gain is reversed at the time of passing either way between the two-leg and one-leg support periods. As from the point of realizing smooth walking it is not desirable for the direction of the gain to reverse instantaneously, a smoother transition is obtained by, as shown in FIG. 12, establishing a short intermediate period during which the gain is set at zero or by smoothly connecting the gains on opposite sides of the transition as shown in FIG. 13. In the case of applying a velocity proportional to the inclination angular velocity deviation delta omega, k omega is in principle set at zero during the leg's free period and then set to a prescribed value at an appropriate time prior to ground contact so as to enable adequate following of transient conditions. (In the flowchart of FIG. 5, the control value is set at zero in step S40 when the robot is in neither a one-leg support period nor a two-leg support period.)

Figure 14:
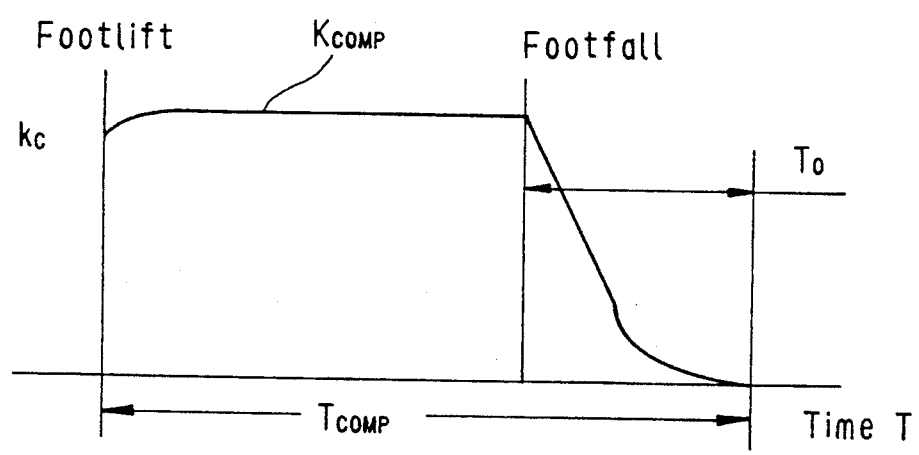
FIG. 14 is a timing chart showing characteristics of a feedback gain used in a virtual compliance control carried out in the FIG. 5 flowchart.

The operation then moves to step S42 in which the virtual compliance control value is determined. Specifically, as shown in FIG. 14 a prescribed period TCOMP between footlift (the event of lifting a foot) and footfall of the robot's free leg is defined as the impact absorption control period, and when it is judged in step S42 that the operation has entered this period, the procedure advances to step S44 in which the gain kc is calculated as kc=kCOMP×f(COUNT), to step S46 in which a fourth speed feedback value iV4 is calculated by multiplying kc by the detected moment M (as shown in FIG. 7), and then, after detection of footfall in step S48, to step 50 in which the counter value is incremented. In other words, the impact absorption gain is established as a function of the count value COUNT and, as shown in FIG. 14, beginning from the time of footfall this gain is progressively diminished to zero over the course of time. When it is found in step S42 that the operation is not in the impact absorption period, the procedure goes to step S52 in which the control value iV4 is set to zero and then to step S54 in which the counter value is reset to zero.

Next, in step S56, all of the calculated control values are added together to obtain a sum iVCOMM which is output to the servo amplifiers for the motor concerned 120, whereafter the joint number counter is incremented in step S58, discrimination is conducted in step S60 as to whether this is the last joint and, if it is, the timer value t is incremented for retrieval of the next target joint angle in step S62 and, so long as it is not found in step 64 that walking is to be discontinued, control values are continuously determined for the respective joints.

As will be understood from the foregoing description, in this embodiment when the robot tilts to an angle beyond that of the preset normal walking state, a ground kicking action in the direction for uprighting the robot into the proper posture is produced in the ankle joints of the supporting leg in proportion to the amount of the inclination angular velocity deviation. The robot is thus able to walk stably at all times irrespective of changes that may arise in the external or internal conditions. As the computations required for this are based mainly on simple geometric equations and, unlike modern control system theory computations, do not involve numerous complex determinants, they can be conducted using a relatively small, low-speed, on-board computer. This is particularly true when the basic walking pattern is computed offline in advance. The invention thus makes a major contribution to the realization of a practicable legged walking robot. Specifically, the fact that the processing required following the selection of an appropriate gain is extremely simple makes it possible to implement the invention using a low-performance computer with low power consumption.

A second embodiment of the invention is illustrated in FIG. 15. In this embodiment, steps S32–S40 of the flowchart of FIG. 5 involve adjustment of only one of the ankle joints 18R and 18L. In contrast to the first embodiment which, as illustrated in FIG. 9, sends feedback control values to the ankle joints of both legs, this second embodiment sends a feedback control value to the ankle joint of only one leg. The effect obtained is essentially the same as that in the first embodiment.

A third embodiment of the invention is shown in FIGS. 16 and 17. In this embodiment, adjustment of the type described above is carried out not only in respect of the ankle joints 18R (L) but also in respect of the knee joints. In this case, the direction of the gains are reversed between the knee and the ankle, as indicated in FIG. 16 in its left and FIG. 17 in its left. Moreover, in this embodiment i≧5 in step S30 of the flowchart of FIG. 5 is changed to i≧7 (the joint number of the knee joint 16L). (It is also possible to carry out adjustment with respect to only the knee joint.)

In the three embodiments described in the foregoing, the deviation between the target and actual values of the inclination angular velocity is used for detecting postural instability of the robot. The invention is not limited to this arrangement, however, and postural instability can alternatively be detected from the angular velocity obtained by differentiating or integrating this deviation. Otherwise the time required for the entire area of the bottom of the foot to come in contact with the ground after landing of the heel can be clocked and compared with an appropriately predetermined value for determining whether the robot is likely to topple forward (when the clocked time is shorter than the prescribed time) backward (when it is longer). In other words, the point at which the foot receives the reactive force from the ground is calculated and if this point moves from the heel region to the toe region faster than under normal circumstances, it is determined that forward overturn is likely, whereas if it moves slower than under normal conditions, it is determined that backward overturn is likely. The general control principle involved is thus to obtain an indicator of the degree of robot postural instability and, based on the magnitude of this indicator, to produce a reactive force against the ground on the supporting leg side.

The gain can either be the same for all of the joints as in the foregoing embodiments or be appropriately varied among the joints.

Although the embodiments set out above carry out the virtual compliance control in addition to the control according to this invention, the control according to this invention can if desired be independently implemented. Since both types of control contribute to the postural stability of the robot, however, a greater degree of locomotion stability can be achieved when they are used together.

The invention was described with reference to examples in which the target joint angles (and target angular velocities) are calculated offline in advance. The invention is, however, not limited to this arrangement and it is alternatively possible to include such higher level factors as the footfall positions and the center of gravity in the gait data calculated offline and, insofar as sudden changes in terrain and other such conditions permit, to determine the gait data in real time.

Next, a fourth embodiment of the invention will be explained with reference to FIG. 18 flowchart. The flowchart is very similar to that illustrated in FIG. 5. Likewise tracing similar steps from S100 and S102, similar locomotive patterns are retrieved at step S112 as was the first embodiment. It should be noted here, however, that in this embodiment the time is expressed by "n", not "t". More specifically, the value $n\theta i$ indicates the target angle of i-th joint at time n. And as shown in FIG. 19, the time is predetermined in series as "0,1,2, . . t0, . . . u0, . . . v0, . . .".

Figure 5B:
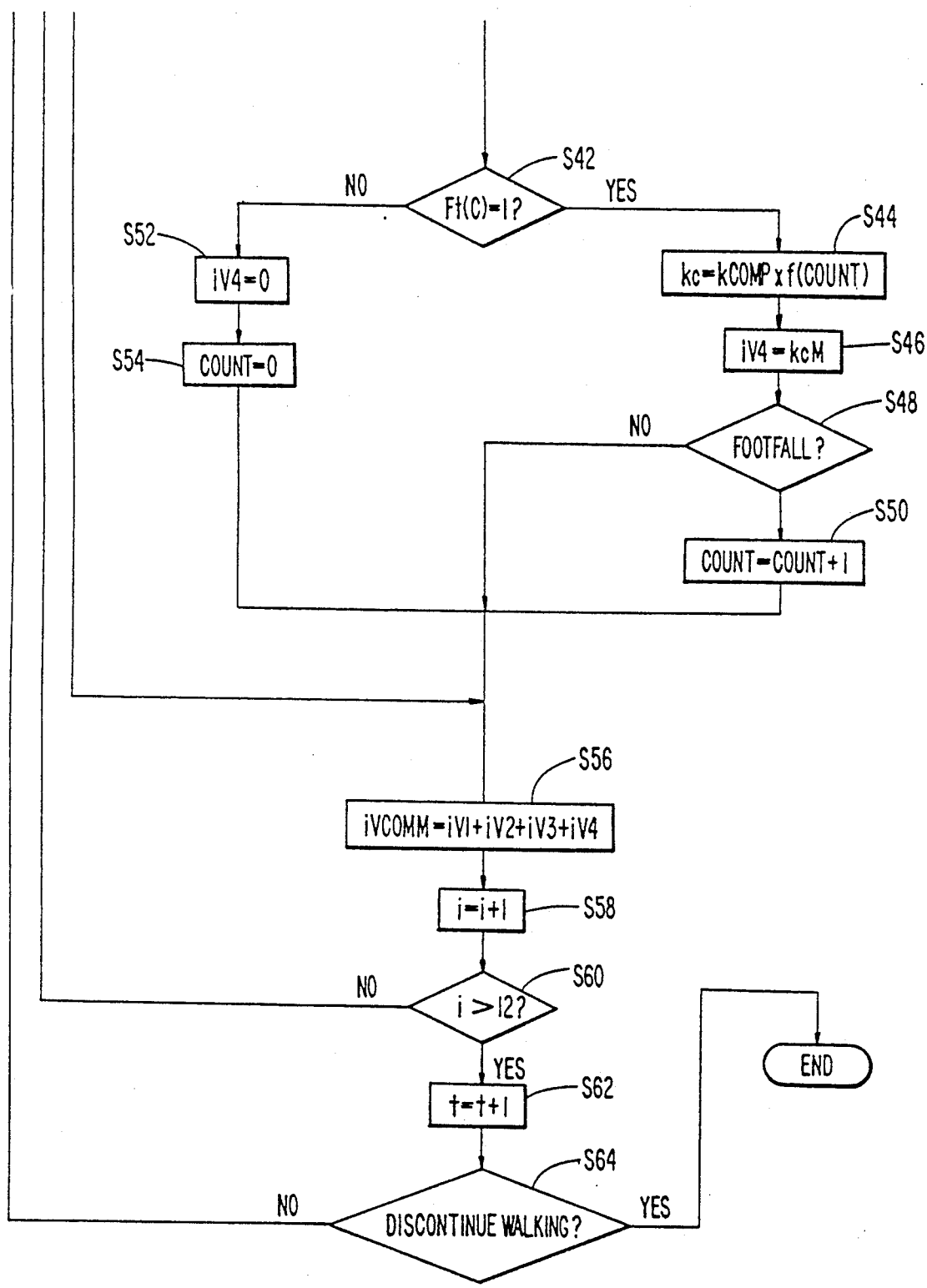
Figure 20:
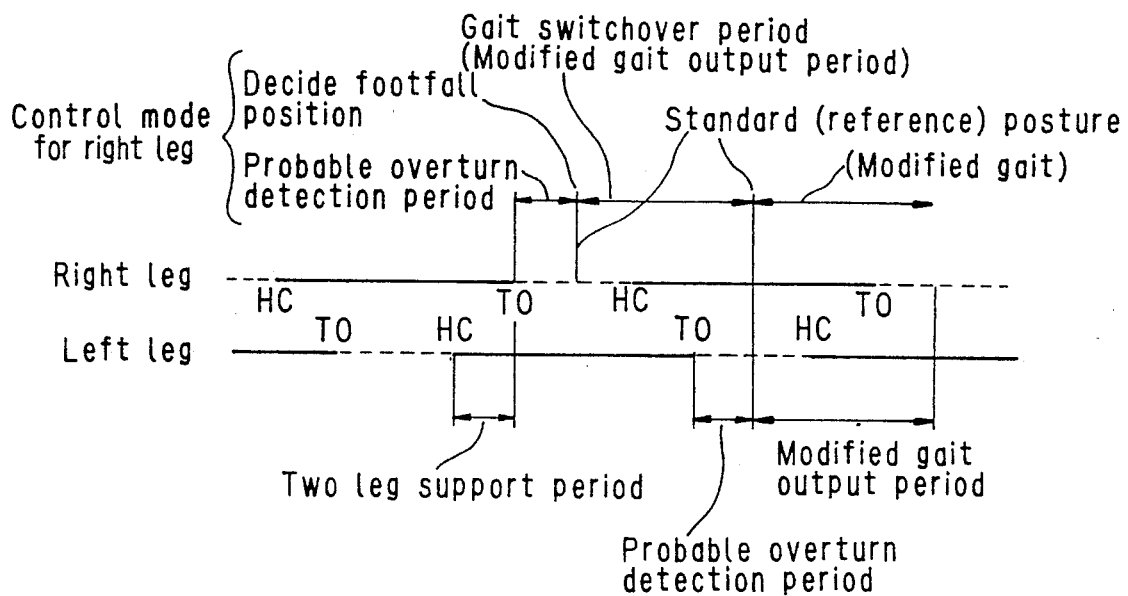
FIG. 20 is a timing chart showing a repetition cycle of gait and specifically illustrating a period for detecting robot overturn and a period for outputting a modified gait.

Again tracing similar steps from S104 to S112 as the FIG. 5 flowchart, next in step S114, the outputs of the inclination sensors etc. are read in. The operation then advances to step S116 in which it is judged from a flag Ft(S) whether or not the procedure is in the probable overturn detection period. This will be explained with reference to FIG. 20. "HC" at the lower part of this figure means "heel contact" (i.e. footfall) and "TO" means "toe off" (i.e. footlift). For either leg, therefore, the periods indicated by solid lines are the "support periods" and those indicated by dashed lines are the "support free periods." The periods during which the solid lines for the two legs overlap are thus the "two-leg support periods." As indicated, in this embodiment gait switchover is conducted during the support free periods and the period immediately preceding such a period is used as a probable overturn detection period during which the risk of overturn is detected and the modified gait is decided, while the period immediately thereafter is used for implementing the modification.

Figure 21:
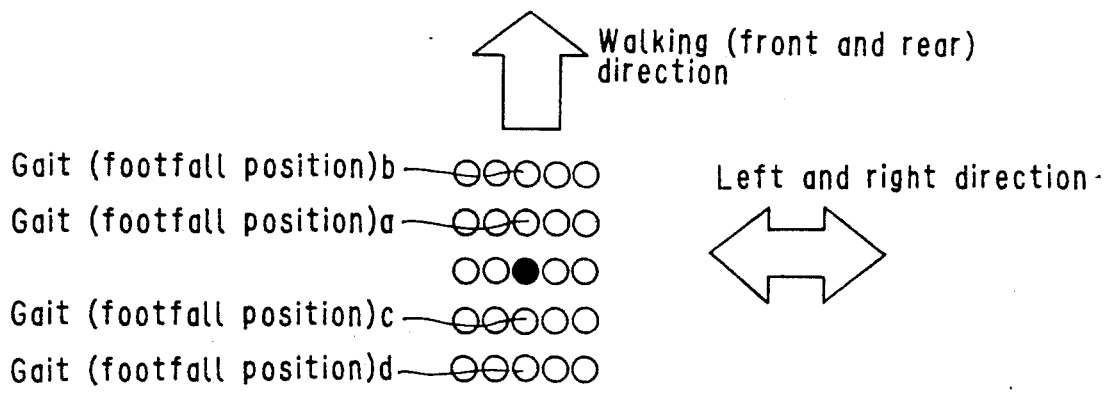
FIG. 21 is an explanatory view showing candidate footfall positions at any of which the robot could land its leg.

The gait modification according to this embodiment will now be explained. As shown in FIG. 21, in this embodiment a plurality of contingent footfall positions are established in addition to the standard footfall position. More specifically, the solid circle in FIG. 21 indicates the footfall position predetermined by the walking pattern calculated offline in advance by a large computer and the other 24 blank circles to the left and right, front and rear indicate contingent footfall positions. When the robot's attitude comes to involve a high risk of overturn, a footfall position appropriate for restoring the robot to the proper posture is selected from among the contingent footfall positions and the gait is modified for achieving footfall at the selected position. Specifically, the target joint angles are modified for restoring postural stability.

Figure 22:
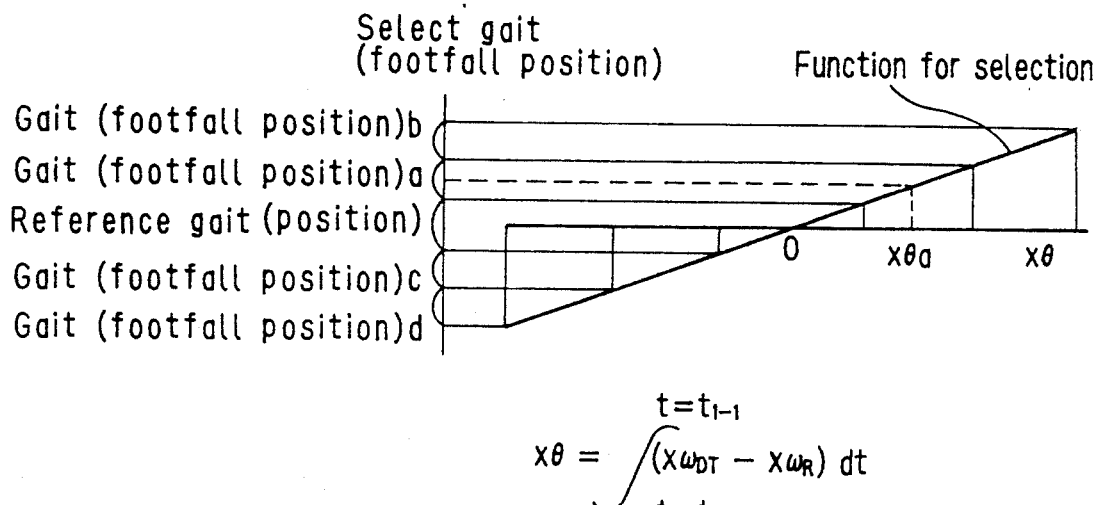
FIG. 22 is a graph showing characteristics of a function for selecting one of the candidate footfall positions illustrated in FIG. 21.

The actual method used for detecting probable overturn is shown in FIG. 22. Namely, the deviation between the target angular velocity omega DT and the actual angular velocity omega R is integrated and summed in both the x and y directions to obtain $x\theta$ and $y\theta$, on the basis of which the gait is selected. More specifically, if the sum in FIG. 22 should be $x\theta a$, the value a at the intersection between this value and a function for selection is selected as the gait. Thus, in FIG. 21, a gait a (more precisely, a footfall position according to the gait a) slightly forward of the footfall position according to the standard gait is selected and the target joint angles are adjusted for realizing this gait. Details are shown in FIGS. 23, 23a–23c. Specifically, if the ankle joint 20L (i=01) is driven to t0$\theta$01, t1$\theta$02 ... t5$\theta$i at left leg TO and then, at the time that gait switchover is decided, the gait is modified and the target values are adjusted to ti$\theta$01a, tj$\theta$01a, ... as shown in the data marked as "Output modified gait" in the figure. At this time, the adjustment is carried out not only with respect to the ankle joint 20L, but also with respect to all or some of the remaining 11 joints (with respect to 20L, 16L, 10L, 20R, 12R and 10R in the illustrated example).

A particularly important point here is that a rule is established that a prescribed standard (reference) attitude is to be output at the start of the gait switchover. That is to say, switchover to the modified attitude is carried out only after an attitude such as that shown in FIG. 24 has once been assumed. This arrangement is used in order to prevent the number of gaits that have to be calculated and stored in the computer memory in advance from increasing in proportion to the square of the number of footfall positions. This will be explained with reference to the example in FIG. 21. In this example, the 25 defined footfall positions are for use in making the first gait modification, i.e. the modification of the standard gait. After the standard gait has been modified to gait a, it may become necessary to modify the gait a to the gait b and then, at the next step, to modify the gait b to the gait c. If 25 candidate footfall positions are defined for each footfall, the number of combinations between the 25 possible footfall positions at which a foot may currently be located and the 25 possible positions at which the foot of the free leg may next fall comes to $25 \times 25 = 625$. This is the number of gaits that would have to be calculated and stored. For avoiding this rapid increase in the number of gaits, therefore, the invention stipulates that the prescribed standard attitude is to be once restored before carrying out gait switchover. Simply stated, this means that the gait modification is conducted after the joint angles have been reset to the prescribed standard angles. This expedient holds down the number of gaits that have to be calculated and stored to memory in advance.

Figure 18B:
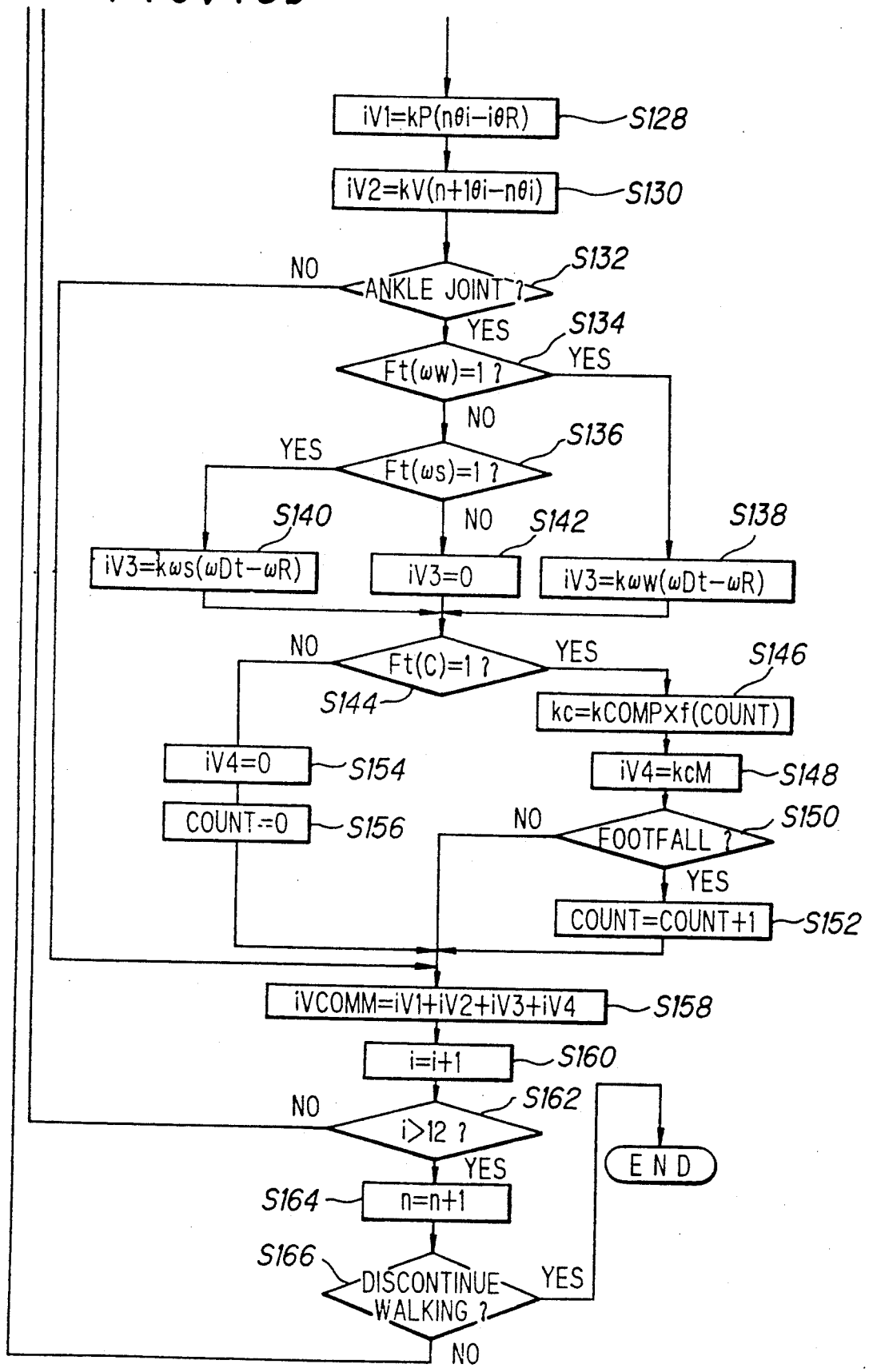
Figure 19:
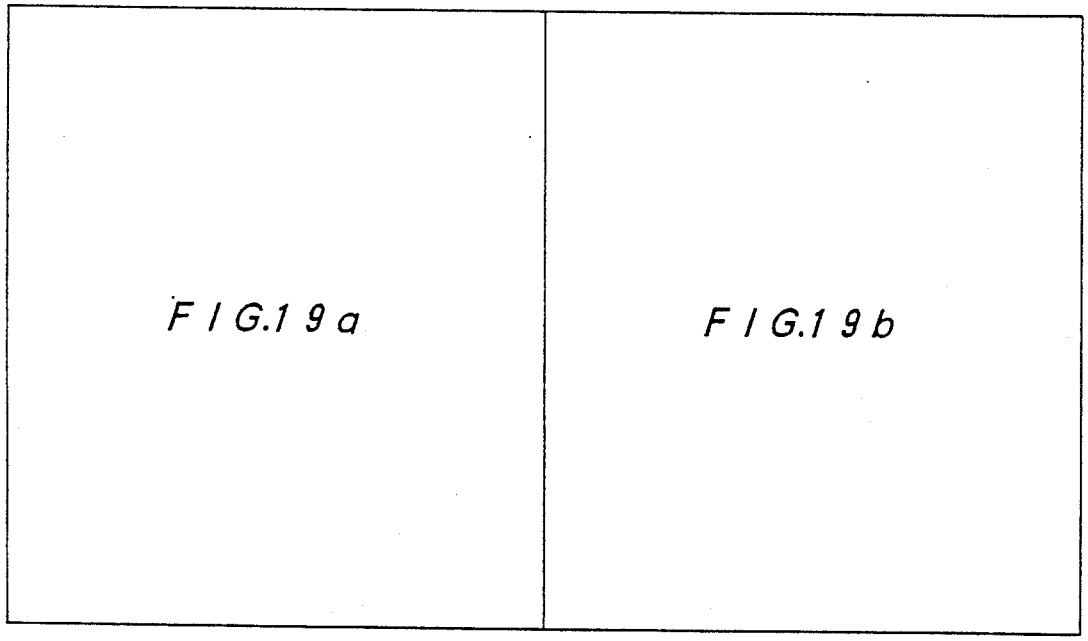

Returning to the flowchart of FIG. 18, 18a–18b when it is found in step S116 that the procedure is in the probable overturn detection period, the inclination angular velocities are integrated in the aforesaid manner. Namely, the inclination angle sums $x\theta$ and $y\theta$ are obtained. Otherwise wise the procedure moves to step S120 in which the sums are set to zero. Then, in step 122, it is judged whether or not the procedure is in the gait switchover period indicated by a flag Ft(T). If the result is affirmative, the operation advances to step S124 in which the gait is selected on the basis of the sums $x\theta$ and $y\theta$ and then to step S126 in which the adjusted target joint angles for the selected gait are read.

Then, in the same way as the first embodiment, the values iV1 to iv4 are calculated through steps S128 to S156 and at step S158 the sum iVCOMM is determined. The procedures are repeated until walking is judged to be discontinued at step S166.

As will be understood from the embodiment just described, the invention defines not only the standard gait but also a plurality of other gaits in which the foot of the free leg lands at different footfall positions. When it is judged that the robot is likely to overturn, the most appropriate gait is selected from among the defined gaits. As the standard gait is calculated in advance, the load on the on-board computer is reduced during walking a the standard gait. Further, since data relating to other precalculated gaits having different footfall positions is stored in the memory of the on-board computer, it suffices to select the optimum one of these gaits through programmed procedures. As a result, a high degree of real time operation and stable locomotion of a robot having a large number of degrees of freedom can be realized even with an unsophisticated computer.

Gait calculation of the foregoing type has ordinarily been carried out separately for the left-right plane and the fore-aft plane and the results thereafter synthesized. When this method is used, it is adequate to define only 9 candidate footfall positions instead of the aforesaid 25. It should be noted, however, that in this case the gait precision declines and the amount of error increases proportionally as the footfall positions depart from those of the standard gait in the right front direction, left rear direction, etc. Since ability to cope with large state changes increases with increasing number of candidate footfall positions, it holds as a general principle that where m candidate positions are defined fore-aft of the standard position and n positions are defined left-right thereof, the total number of gaits that have to be stored to memory for precise locomotion becomes $(2m) \times (2n) = 4$ mn. However, if small errors can be tolerated, $(2m+2n-1)$ gaits will suffice. In this latter case, a considerable saving of computer memory space can be realized even if the number of candidate positions is increased. Memory space can also be saved by interrelating and calculating the candidate positions by linear interpolation or the like or by calculating gaits corresponding to desired footfall positions by interpolating or extrapolating as required among gaits corresponding to a finite number of footfall positions stored in memory beforehand.

Figure 24:
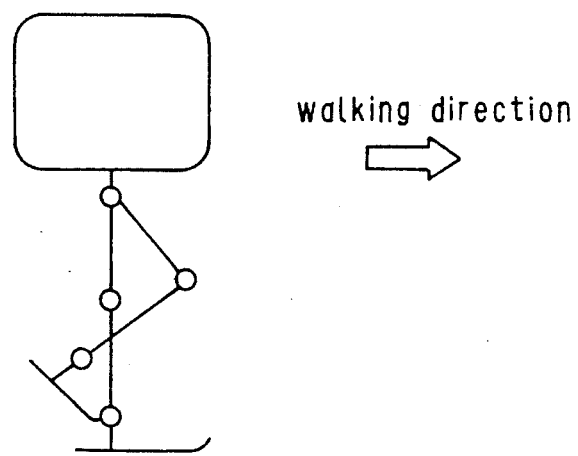
FIG. 24 is a side view of the robot showing a standard or reference posture which the robot has to pass before carrying out the gait modification.
Figure 23:
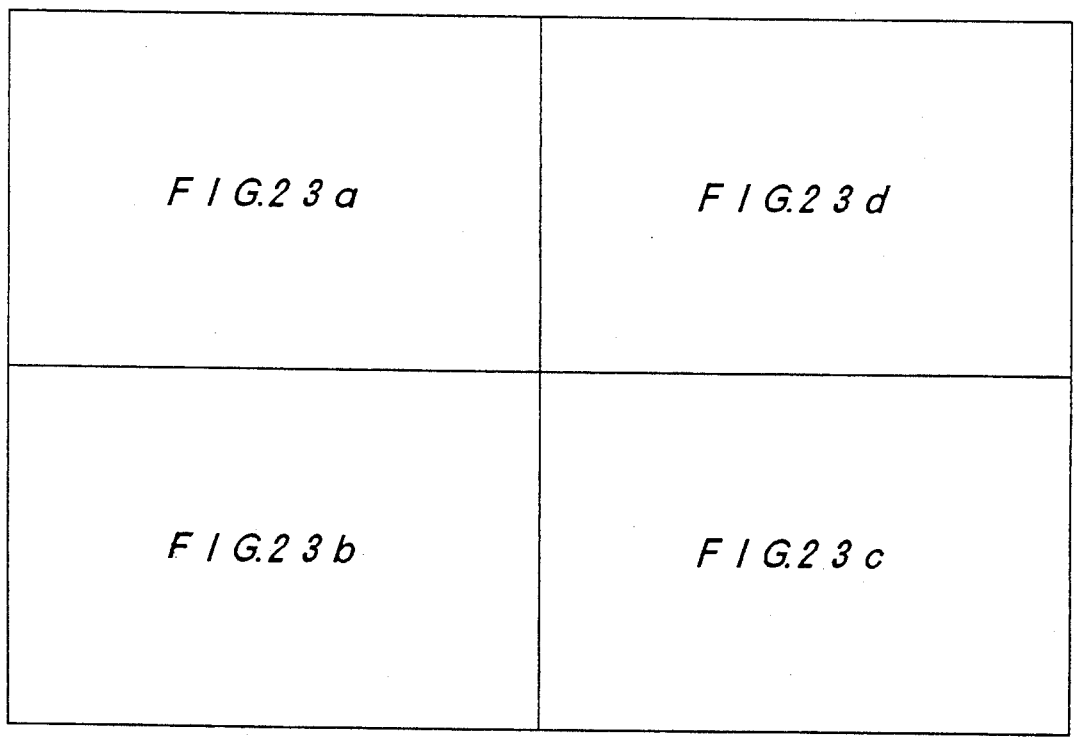

This invention also saves memory space by causing the robot to pass through the standard attitude shown in FIG. 24 at the time of switching between gaits. While the standard attitude was expressed in terms of angles in the embodiments just described, the invention is not limited to this and the standard attitude may further include angular velocities and/or angular accelerations, with gait switchover being conducted after the robot has passed through the so defined standard attitude.

Figure 25:
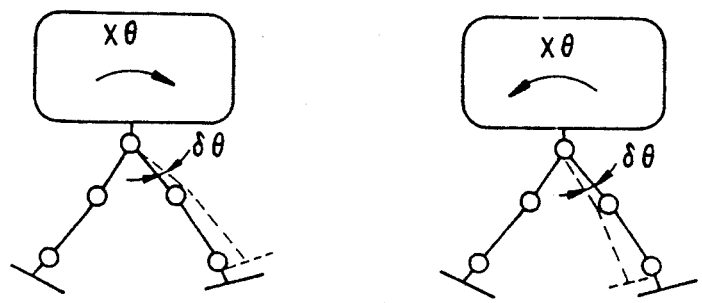
FIG. 25 is an explanatory view showing the fifth embodiment of the present invention in which a modified gait is realized by adjusting some of the robot joint angles.

A fifth embodiment of the invention is illustrated in FIG. 25. The fourth embodiment defines a plurality of footfall positions and adjusts all of the joints so as to achieve footfall at a selected one of the defined positions. In contrast, the fifth embodiment restores postural stability when it has been detected that overturn is likely by, as shown in FIG. 25, adjusting only the hip and ankle joints.

Figure 26:
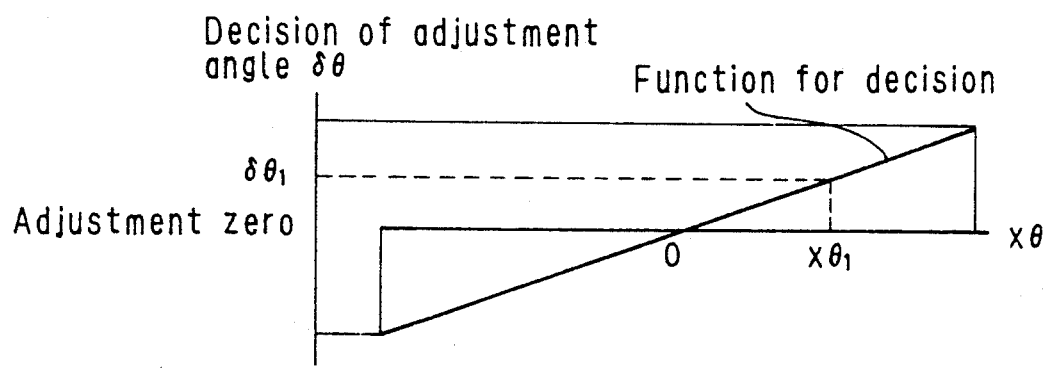
FIG. 26 is a graph showing characteristics of a function for adjusting the robot joint angles in the fifth embodiment.
Figure 27:
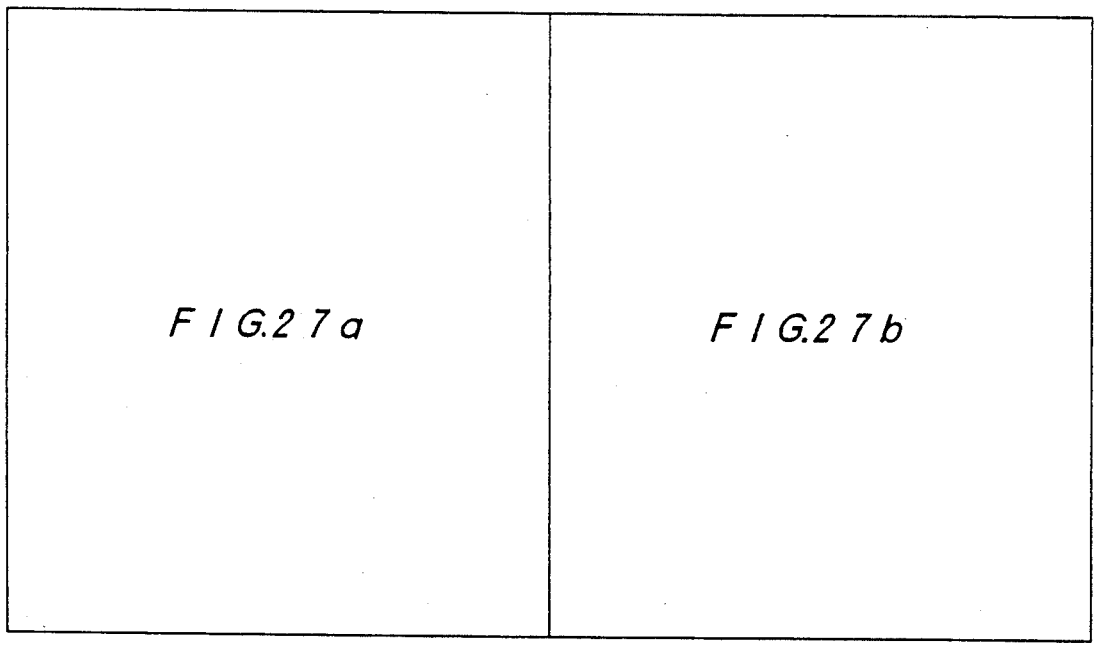

Specifically, at step 124 of the flowchart shown in FIG. 18, 18a-18b are a function for decision shown in FIG. 26 is used for determining an adjustment angle 60 on the basis of the sums $x\theta$, $y\theta$ of the integrated inclination angles and the so-determined adjustment angle $\delta\theta$ is used for adjusting the set joint angles of the hip and ankle joints. If the sum is for the x direction, i.e. if it is $x\theta$, the joints (12L(R), 18L(R)) are adjusted. $\delta\theta$ is added to or subtracted from the set joint angle depending on whether the value determined according to FIG. 26 is positive or negative. The adjustment data is shown in FIGS. 27, 27a-27b. (Only in this figure and in FIGS. 30, 30a-30b explained later, the joints are numbered as "20L=1, 18L=2, .. 10L=5, 12L=6, 12R=7, 10R=8, .. 18R=11, 20R=12.") Although this figure shows only the adjustment in the pitch direction, that in the roll direction is similar. $\delta\theta$ is obtained from $y\theta$ using a function that is the same as or similar to the decision function of FIG. 26 and the result is used for adjusting the joints concerned (14L(R), 20L(R)).

Figure 28:
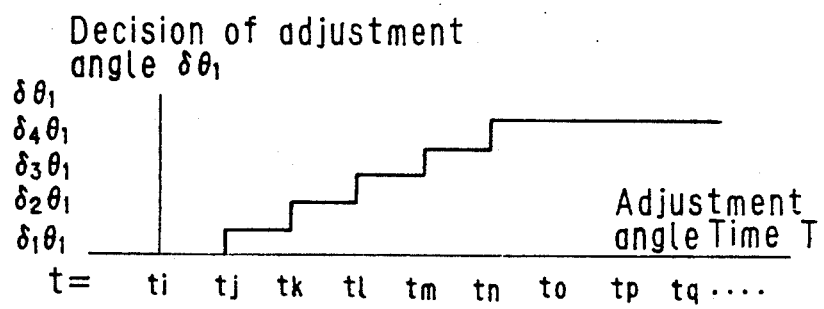
FIG. 28 is a timing chart showing characteristics of the function with respect to time.

Since the locomotion smoothness will be impaired if the switchover from the standard gait to the modified gait is carried out all at one time, the adjustment is implemented gradually in the manner shown in FIG. 28. In the example according to this figure and FIG. 27, the adjustment is carried out in five steps. The same principle is applied during return to the standard gait after the attitude has stabilized.

Since the fifth embodiment does not require the definition of a plurality of footfall positions and not all of the joints have to be adjusted, correction for postural instability and restoration to a stable posture at the time of encountering a change in conditions not envisioned by the preset locomotion data can be realized even more readily. It should be understood that this fifth embodiment also requires that the robot be once returned to the standard attitude before changing the gait. Because of this, each of the gaits to be stored in memory can be in the form of independent time series joint angle data. Since no special joint angle data for attitude transition is required, therefore, the amount of memory space required is reduced.

Figure 29:
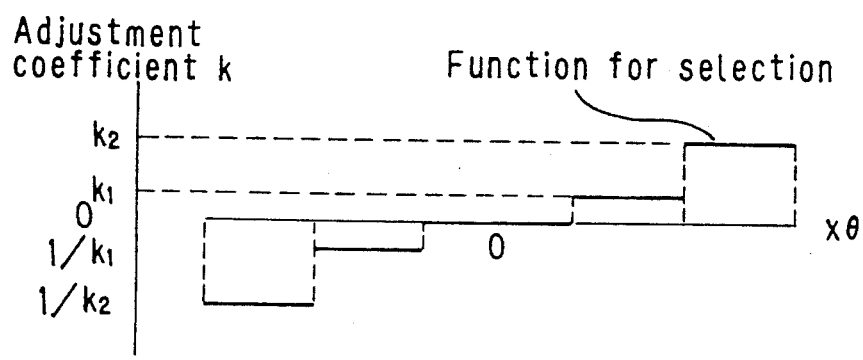
FIG. 29 is a graph showing characteristics of the function according to the sixth embodiment of the present invention.
Figure 31:
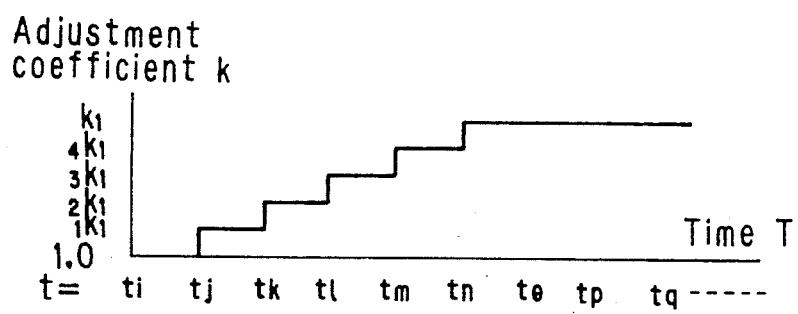
FIG. 31 is a timing chart showing characteristics of the function with respect to time.
Figure 30:
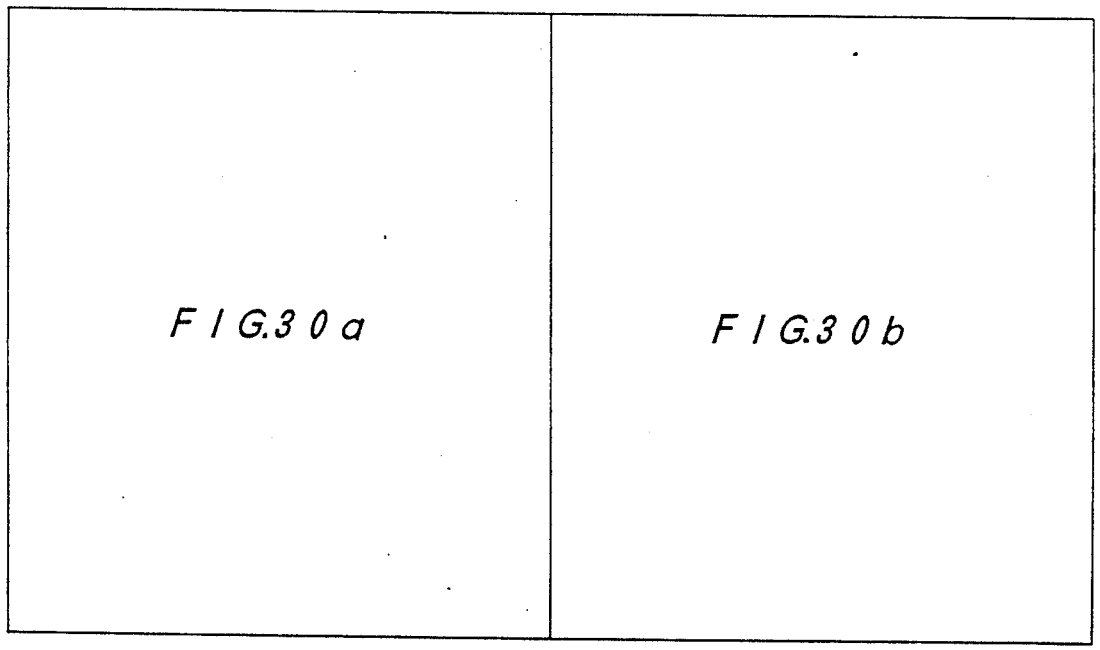

A sixth embodiment will now be explained with reference to FIG. 29. This embodiment differs from the fourth one in that angular adjustment is conducted not by addition and subtraction but by multiplication or division. As can be seen in FIG. 29, an adjustment coefficient is determined to be k1, k2 ... if the sum $x\theta$ $y\theta$) is positive and to be 1/k1, 1/k2 ... if it is negative, and the angle of the pitch (roll) direction joint is multiplied by the so-determined coefficient. Details regarding this adjustment are shown in FIGS. 30, 30a-30b. As shown in FIG. 31, the adjustment in this sixth embodiment is also carried out gradually for ensuring smooth modification of the gait.

In the sixth and fifth embodiments, the adjustment is effected by multiplication (division) and addition (subtraction), namely by a linear function. This can be expressed in general terms for the pitch direction, for example, as $$n\theta iREV = n\theta iSTD \times Ax\theta + Bx\theta$$

where $n\theta iREV$ is the modified gait joint angle, $n\theta iSTD$ is the standard gait joint angle, and A and B are constants.

At any rate, both the fifth and sixth embodiments can be modified in various ways. For example, in these two embodiments only the direction of the adjustment is changed depending on the sign of the sum while the magnitude thereof is kept the same. However, it is alternatively possible to determine the magnitudes independently. In the sixth embodiment, moreover, instead of carrying out division it is possible to use a separate adjustment coefficient. Nor is it necessary to use a linear function. For example, the adjustment can be determined using fuzzy reasoning or the like.

Furthermore, the invention is not limited to the method of calculating probable overturn from the inclination angle used in the fourth to sixth embodiments and it is alternatively possible to base the calculation on the inclination angular velocity or to calculate the point at which the foot receives the reactive force from the ground, compare the velocity at which this point moves from the heel region to the toe region with that under normal circumstances and judge that overturn is probable when this speed is too fast.

While only the joints of the free leg are adjusted in the above-described fourth to sixth embodiments, the invention is not limited to this and it is possible, for example, to divide the adjustments between the joints of the free and supporting legs.

Moreover, the invention is not limited by the presumption in the foregoing embodiments that only the target joint angles or target joint angle velocities are calculated offline beforehand. It also encompasses cases where the target data calculated offline further includes such higher level factors as the footfall positions and the center of gravity and, insofar as sudden changes in terrain and other such conditions permit, cases in which the gait is determined in real time.

In addition, while the invention was described with respect to a biped walking robot, it is applicable not only to such robots but also to robots having three or more legs.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling locomotion of a biped walking robot having a body and two leg linkages each connected to the body and each having a foot portion and a leg portion connected by an ankle drive joint, comprising:

first means for determining a differential value of n-th order of an actual inclination angle of the robot body with respect to the direction of gravity;

second means for calculating a deviation between the determined value and a reference value to determine a drive speed of the ankle drive joint of the leg linkage which supports the robot weight by multiplying the deviation by a gain; and servo motor means for driving the ankle drive joint at the determined drive speed.

2. A system according to claim 1, wherein said second means determines the drive speed of the ankle drive joint such that the foot portion kicks the ground in a direction for uprighting the robot.

3. A system according to claim 1, wherein said second means determines the drive speed of the ankle drive joint of at least one of the leg linkages which support the robot weight.

4. A system according to claim 1, wherein the gain is made zero between a phase within which the supporting leg linkage supports the robot weight and a phase within which that leg linkage is free.

5. A system for controlling locomotion of a biped walking robot having a body and two leg linkages each connected to the body by a hip drive joint and each having a foot portion and a leg portion connected by an ankle drive joint, comprising:

servo control means for determining a control value for each of the hip drive joints and the ankle drive joints to follow up a target value such that the robot walks in a accordance with a predetermined gait;

first means for determining a differential of n-th order of an actual inclination angle of the robot body with respect to the ground;

second means for calculating a deviation between the determined value and a reference value to modify the predetermined gait in response to the calculated deviation; and third means for establishing a plurality of candidate robot foot portion landing positions including those for the predetermined gait and for adjusting the control value so that the robot walks in accordance with a modified gait and the foot portion lands at a selected landing position.

6. A system according to claim 5, wherein the control value is determined by dividing robot motion into one for the fore-aft plane and the other for left-and-right plane and by synthesizing the results thereafter, and when the number of the candidate landing positions are m in the fore-aft plane and n in the left-and-right plane, the total number of the positions is m+n−1.

7. A system according to claim 5, wherein said third means adjusts the control value in such a manner that a predetermined portion of the leg linkages passes through a prescribed spatial point.

8. A system according to claim 5, wherein said third means adjusts the control value in such a manner that the predetermined gait is modified in smooth succession with respect to time.

9. A system according to claim 5, wherein said third means adjusts the control value in a period within one repetition cycle of a leg support phase and a leg support free phase of the predetermined gait.

10. A system according to claim 5, wherein said second means accumulates the deviation and modifies the predetermined gait in response to the accumulated value.

11. A system for controlling locomotion of a biped walking robot having a body and two leg linkages each connected to the body by a hip drive joint and each having a foot portion and a leg portion connected by an ankle drive joint, comprising:

servo control means for determining a control value for each of the hip drive joints and the ankle drive joints to follow up a target value such that the robot walks in accordance with a predetermined gait;

first means for determining a differential of n-th order of an actual inclination angle of the robot body with respect to the direction of gravity;

second means for calculating a deviation between the determined value and a reference value to determine whether to modify the predetermined gait in response to the calculated deviation; and third means for establishing a plurality of candidate landing positions and to adjust the control value to realize a modified gait in such a manner that the foot portion lands at a position calculated from the candidate landing positions by interpolation or extrapolation.

12. A system according to claim 11, wherein said third means adjusts the control value in such a manner that a predetermined portion of the leg linkages passes through a prescribed spatial point.

13. A system according to claim 11, wherein said third means adjusts the control value in such a manner that the predetermined gait is modified in smooth succession with respect to time.

14. A system according to claim 11, wherein said third means adjusts the control value in a period within one repetition cycle of a leg support phase and a leg support free phase of the predetermined gait.

15. A system according to claim 11, wherein said second means accumulates the deviation and modifies the predetermined gait in response to the accumulated value.

16. A system for controlling locomotion of a biped walking robot having a body and two leg linkages each connected to the body by a hip drive joint and each having a foot portion and a leg portion connected by an ankle drive joint, comprising:

servo control means for determining a control value for each of the hip drive joints and the ankle drive joints to follow up a target value such that the robot walks in accordance with a predetermined gait;

first means for determining a differential of n-th order to an actual inclination angle of the robot body with respect to the direction of gravity;

second means for calculating a deviation between the determined value and a reference value to modify the predetermined gait using a function of n-th order of the calculated deviation; and third means for adjusting the control value of at least one of the drive joints to realize the modified gait.

17. A system according to claim 16, wherein said third means adjusts the control value in such a manner that a predetermined portion of the leg linkages passes through a prescribed spatial point.

18. A system according to claim 16, wherein said third means adjusts the control value in such a manner that the predetermined gait is modified in smooth succession with respect to time.

19. A system according to claim 16, wherein said third means adjusts the control value in a period within one repetition cycle of a leg support phase and a leg support free phase of the predetermined gait.

20. A system according to claim 16, wherein said second means accumulates the deviation and modifies the predetermined gait using the function of n-th order of the accumulated value.

21. A system for controlling locomotion of a biped walking robot having a body and two leg linkages each connected to the body by a hip drive joint and each having a foot portion and a leg portion connected by an ankle drive joint, the leg portion having a thigh link and a crus link connected by a knee drive joint, comprising:

servo control means for determining a control value for each of the hip drive joints, the ankle drive joints and the knee drive joints to follow up a target value such that the robot walks in accordance with a predetermined gait;

first means for determining a differential of n-th order of an actual inclination angle of the robot body with respect to the direction of gravity;

second means for calculating a deviation between the determined value and a reference value to modify the predetermined gait in response to the calculated deviation; and third means for adjusting the control value of at least one of the drive joints to realize a modified gait.

22. A system for controlling locomotion of a biped walking robot having a body and two leg linkages each connected to the body by a hip drive joint and each having a foot portion and a leg portion connected by an ankle drive joint, the leg portion having a thigh link and a crus link connected by a knee drive joint, comprising:

first means or determining a differential of n-th order of an actual inclination angle of the robot body with respect to the direction of gravity;

second means for calculating a deviation between the determined value and a reference value to determine a drive speed of the ankle drive joint and the knee drive joint of the leg linkage which supports the robot weight by multiplying the deviation by a gain; and servo motor means for driving the ankle drive joint and the knee drive joint at a determined drive speed.

23. A system according to claim 22, wherein said second means determines the drive speed of the ankle drive joint and the knee drive joint such that the foot portion kicks the ground in the direction for uprighting the robot.

24. A system according to claim 22, wherein the gain is made zero between a phase within which the supporting leg linkage supports the robot weight and a phase within which that leg linkage is free.

* * * * *